(12) United States Patent
Kuri

(10) Patent No.: US 9,933,552 B2
(45) Date of Patent: Apr. 3, 2018

(54) OPTICAL ELEMENT, OPTICAL DEVICE, AND ELECTRONIC DEVICE

(71) Applicant: Seiko Epson Corporation, Tokyo (JP)

(72) Inventor: Ryohei Kuri, Fujimi (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 14/525,672

(22) Filed: Oct. 28, 2014

(65) Prior Publication Data

US 2015/0116831 A1    Apr. 30, 2015

(30) Foreign Application Priority Data

Oct. 29, 2013    (JP) ................... 2013-223983

(51) Int. Cl.
G02B 5/26    (2006.01)
G02B 5/28    (2006.01)

(52) U.S. Cl.
CPC .............. G02B 5/26 (2013.01); G02B 5/284 (2013.01)

(58) Field of Classification Search
CPC . G02B 5/26; G02B 5/28; G02B 5/284; G02B 5/288
See application file for complete search history.

(56) References Cited

U.S. PATENT DOCUMENTS

| | | | | |
|---|---|---|---|---|
| 2011/0220970 A1* | 9/2011 | Komatsu | ........... | H01L 27/14618 257/228 |
| 2011/0222158 A1* | 9/2011 | Sano | .................. | G02B 6/29361 359/584 |
| 2011/0279824 A1 | 11/2011 | Blomberg et al. | | |
| 2012/0019812 A1* | 1/2012 | Shinto | ....................... | C22C 5/06 356/213 |
| 2012/0257280 A1 | 10/2012 | Sano et al. | | |
| 2013/0214123 A1 | 8/2013 | Shinto | | |
| 2015/0260981 A1 | 9/2015 | Sano et al. | | |

FOREIGN PATENT DOCUMENTS

| | | | | |
|---|---|---|---|---|
| CN | 102736156 A | 10/2012 | | |
| CN | 103257386 A | 8/2013 | | |
| JP | 2003-258362 A | 9/2003 | | |
| JP | 2013-055223 A | 3/2013 | | |
| JP | 2013-072930 A | 4/2013 | | |
| JP | 5970686 B2 | 8/2016 | | |
| KR | 20150042362 A | * 4/2015 | ............ | H01L 33/50 |
| WO | WO-2010-086502 A1 | 8/2010 | | |

* cited by examiner

*Primary Examiner* — Darryl J Collins
*Assistant Examiner* — Journey Sumlar
(74) *Attorney, Agent, or Firm* — Harness, Dickey & Pierce, P.L.C.

(57) ABSTRACT

An optical element includes a conductive fixed reflection film, a movable reflection film that faces the fixed reflection film, a transmissive second insulating film which is provided on a side of the fixed reflection film opposite to the movable reflection film, and a light receiving unit which is provided on a side of the second insulating film opposite to the fixed reflection film and within a light receiving region where the fixed reflection film, the movable reflection film, and the second insulating film overlap each other in an element plan view when seen from film thickness directions of the fixed reflection film and the movable reflection film, and which receives light emitted from the fixed reflection film.

13 Claims, 14 Drawing Sheets

OPTICAL ELEMENT, OPTICAL DEVICE, AND ELECTRONIC DEVICE

BACKGROUND

1. Technical Field

The present invention relates to an optical element, an optical device, and an electronic device.

2. Related Art

Hitherto, there has been known an optical element which has a configuration in which an interference filter is integrally formed with a light receiving element (for example, see Pamphlet of International Publication No. 2010/086502).

A Fabry-Perot etalon (interference filter) disclosed in Pamphlet of International Publication No. 2010/086502 includes a pair of mirror layers facing each other and is provided with a light receiving unit. The light receiving unit is provided so as to be adjacent to a side of one mirror layer which is opposite to the other mirror layer and receives light passing through the interference filter. In addition, each of the mirror layers has an electrode interposed therein, and an electrostatic actuator is constituted by these electrodes. The size of a gap between the pair of mirror layers is changed by applying a voltage to the electrostatic actuator.

Incidentally, in a device disclosed in Pamphlet of International Publication No. 2010/086502 described above, the light receiving unit is provided immediately below the mirror layer. Here, in order to change the size of the gap between the mirror layers in the Fabry-Perot etalon, it is necessary to apply a high voltage to the electrostatic actuator.

However, in the device disclosed in Pamphlet of International Publication No. 2010/086502, the light receiving unit is provided immediately below the mirror layer. Accordingly, as described above, when high voltage is applied to the electrostatic actuator, the light receiving unit is also influenced. Thus, the amount of noise components increases in an output signal from the light receiving unit, which results in a problem of an accuracy of a light amount measurement being degraded.

SUMMARY

An advantage of some aspects of the invention is to provide an optical element, an optical device, and an electronic device which are capable of performing a light amount measurement with a high level of accuracy.

An optical element according to an aspect of the invention includes a first reflection film that has conductivity; a second reflection film that faces the first reflection film; an insulating film, having light transmittance, which is provided on a side of the first reflection film opposite to the second reflection film; and a light receiving unit which is provided on a side of the insulating film opposite to the first reflection film and within a region where the first reflection film, the second reflection film, and the insulating film overlap each other in a plan view when seen from film thickness directions of the first reflection film and the second reflection film, and which receives light emitted from the first reflection film.

In the aspect of the invention, the first reflection film has conductivity, and the insulating film is provided between the first reflection film and the light receiving unit.

In such a configuration, it is possible to suppress a disadvantage that electrical noise (for example, voltage noise generated due to a driving voltage applied to an actuator for changing the size of a gap between the first reflection film and the second reflection film) is input to the light receiving unit from the outside, using the conductive first reflection film. In other words, it is possible to cause the first reflection film to function as a shield electrode and to suppress the input of electrical noise to the light receiving unit from the outside. In addition, when the first reflection film electrically communicates with the light receiving unit, an electrical signal such as electrical noise input to the first reflection film may be input to the light receiving unit as it is. However, in the aspect of the invention, the insulating film is provided between the first reflection film and the light receiving unit, and thus it is possible to suppress the input of the electrical signal, which is input to the first reflection film, to the light receiving unit.

In addition, since a configuration is given in which a Fabry-Perot etalon, which is constituted by the first reflection film and the second reflection film, and the light receiving unit are provided within the optical element, a distance between the first reflection film and the light receiving unit is short, and thus it is possible to suppress a disadvantage that, for example, stray light going around the first reflection film is incident on the light receiving unit.

Therefore, it is possible to suppress the mixing of noise components (electrical noise or noise due to stray light) into a detection signal which is output from the light receiving unit and to perform a light amount measurement using the light receiving unit with a high level of accuracy.

It is preferable that the optical element according to the aspect of the invention further includes a first substrate that has a first surface on which the light receiving unit and the first reflection film are provided; a second substrate that faces the first surface of the first substrate and is provided with the second reflection film; and an electrode which is provided in the second substrate and faces at least a portion of the first reflection film.

In the configuration described above, since the electrode facing a portion of the first reflection film is provided in the second substrate, it is possible to cause the electrode and the first reflection film to function as electrostatic actuators and to change the size of the gap between the first reflection film and the second reflection film.

In this case, it is preferable that the first reflection film be grounded (be set to a ground potential) and that a desired potential be applied to the electrode provided in the second substrate. Thus, even when electrical noise is generated from the electrode at the time of applying an electrical signal to the electrode of the second substrate, the electrical noise is not input to the light receiving unit by shielding using the first reflection film, and it is possible to allow the electrical noise to escape to the outside from the first reflection film. Therefore, it is possible to more reliably suppress a disadvantage that the electrical noise is input to the light receiving unit.

An optical element according to another aspect of the invention includes a first reflection film; a second reflection film that faces the first reflection film; a conductive film, having light transmittance, which is provided on a side of the first reflection film opposite to the second reflection film; an insulating film, having light transmittance, which is provided on a side of the conductive film opposite to the first reflection film; and a light receiving unit which is provided on a side of the insulating film opposite to the conductive film and within a region where the first reflection film, the second reflection film, the conductive film, and the insulating film overlap each other in a plan view when seen from film thickness directions of the first reflection film and the second reflection film, and which receives light emitted from the first reflection film.

In the aspect of the invention, the conductive film and the insulating film is provided between the first reflection film and the light receiving unit, and the conductive film and the light receiving unit are insulated from each other by the insulating film.

In such a configuration, it is possible to suppress a disadvantage that electrical noise (for example, voltage noise generated due to a driving voltage applied to an actuator for changing the size of a gap between the first reflection film and the second reflection film) is input to the light receiving unit from the outside, using the conductive film. In other words, even when the electrical noise is input to the conductive film from the outside, it is possible to cause the conductive film to function as a shield electrode and to suppress the input of noise to the light receiving unit. In addition, when the conductive film electrically communicates with the light receiving unit, an electronic signal such as electrical noise input to the conductive film may be input to the light receiving unit as it is. However, in the aspect of the invention, the insulating film is provided between the conductive film and the light receiving unit, and thus it is possible to suppress the input of the electrical signal, which is input to the conductive film, to the light receiving unit.

In addition, since a configuration is given in which an interference filter, which is constituted by the first reflection film and the second reflection film, and the light receiving unit are provided within the optical element, a distance between the first reflection film and the light receiving unit is short, and thus it is possible to suppress a disadvantage that, for example, stray light going around the first reflection film is incident on the light receiving unit.

Therefore, it is possible to suppress the mixing of noise components (electrical noise or noise due to stray light) into a detection signal which is output from the light receiving unit and to perform a light amount measurement using the light receiving unit with a high level of accuracy.

In the optical element according to the aspect of the invention, it is preferable that a second insulating film is provided between the first reflection film and the conductive film.

In the configuration described above, the first reflection film and the conductive film are insulated from each other by the second insulating film. In this case, for example, even when the first reflection film is constituted by a conductive material and function as an electrode, the electrical signal input to the first reflection film is not transmitted to the conductive film, and thus electrical noise is not input to the light receiving unit from the conductive film. In addition, when the electrical signal is input to the first reflection film even in a case in which the electrical noise is generated, the electrical noise is not input to the light receiving unit by the conductive film and the insulating film, and thus it is possible to suppress a disadvantage that noise components are mixed into a detection signal from the light receiving unit.

In the optical element according to the aspect of the invention, it is preferable that a third insulating film is provided on a side of the light receiving unit opposite to the insulating film and in a region overlapping at least the light receiving unit in the plan view, and a second conductive film is provided on a side of the third insulating film opposite to the light receiving unit and in a region overlapping at least the light receiving unit in the plan view.

In the configuration described above, the second conductive film is provided on a side of the light receiving unit opposite to the first reflection film through the third insulating film. For this reason, even when an electrical noise is input from the side opposite to the first reflection film, it is possible to cause the second conductive film to function as the shield electrode and to suppress a disadvantage that the electrical noise is input to the light receiving unit. Therefore, it is possible to more reliably suppress a disadvantage that noise components are mixed into a detection signal from the light receiving unit.

In the optical element according to the aspect of the invention, it is preferable that the second conductive film is formed of a low-reflection metal having a reflectance which is smaller than a predetermined value.

In the configuration described above, the second conductive film is formed of a low-reflection metal (for example, chromium oxide). The predetermined value can be appropriately set using the accuracy of measurement and the like, and can be set to, for example, a reflectance equal to or less than 1% with respect to all wavelengths to be measured.

In such a configuration, it is possible to suppress a disadvantage that stray light components, which have not been incident between the second reflection film and the first reflection film in light incident within the optical element, are reflected from the second conductive film and are incident on the back of the light receiving unit (on the side opposite to the first reflection film).

In the optical element according to the aspect of the invention, it is preferable that a third insulating film is provided on a side of the light receiving unit opposite to the insulating film and in a region overlapping at least the light receiving unit in the plan view. A second conductive film may be provided on a side of the third insulating film opposite to the light receiving unit and in a region overlapping at least the light receiving unit in the plan view. The first reflection film and the second conductive film may be electrically connected to each other.

In the configuration described above, the first reflection film and the second conductive film are electrically connected to each other. In this case, the conductive film and the second conductive film are grounded, and thus it is possible to allow electrical noise, which is input to each conductive film, to escape.

In the optical element according to the aspect of the invention, it is preferable that a third insulating film is provided on a side of the light receiving unit opposite to the insulating film and in a region overlapping at least the light receiving unit in the plan view, a second conductive film is provided on a side of the third insulating film opposite to the light receiving unit and in a region overlapping at least the light receiving unit in the plan view, and the conductive film and the second conductive film are electrically connected to each other.

In the configuration described above, the conductive film and the second conductive film are electrically connected to each other. In this case, the conductive film and the second conductive film are grounded. Thus, when electrical noise is input to the films, it is possible to allow the electrical noise to easily escape.

An optical device according to still another aspect of the invention includes an optical element and a housing that accommodates the optical element. The optical element includes a first reflection film that has conductivity; a second reflection film that faces the first reflection film; an insulating film, having light transmittance, which is provided on a side of the first reflection film opposite to the second reflection film; and a light receiving unit which is provided on a side of the insulating film opposite to the first reflection film and within a region where the first reflection film, the second reflection film, and the insulating film overlap each other in a plan view when seen from film thickness directions of the first reflection film and the second reflection film, and which receives light emitted from the first reflection film.

As described above, in the aspect of the invention, it is possible to suppress the mixing of noise into a detection signal which is output from the light receiving unit in the optical element and to perform a light amount measurement with a high level of accuracy.

In addition, the optical element is accommodated within the housing. Thus, for example, it is possible to suppress the attachment of foreign substances to the first reflection film and the second reflection film and to protect an interference filter from an impact and the like.

An optical device according to yet another aspect of the invention includes an optical element and a housing that accommodates the optical element. The optical element includes a first reflection film; a second reflection film that faces the first reflection film; a conductive film, having light transmittance, which is provided on a side of the first reflection film opposite to the second reflection film; an insulating film, having light transmittance, which is provided on a side of the conductive film opposite to the first reflection film; and a light receiving unit which is provided on a side of the insulating film opposite to the conductive film and within a region where the first reflection film, the second reflection film, the conductive film, and the insulating film overlap each other in a plan view when seen from film thickness directions of the first reflection film and the second reflection film, and which receives light emitted from the first reflection film.

As described above, in the aspect of the invention, it is possible to suppress the mixing of noise into a detection signal which is output from the light receiving unit in the optical element and to perform a light amount measurement with a high level of accuracy.

In addition, the optical element is accommodated within the housing. Thus, for example, it is possible to suppress the attachment of foreign substances to the first reflection film and the second reflection film and to protect an interference filter from an impact and the like.

An electronic device according to still yet another aspect of the invention includes an optical element and a control unit that controls the optical element. The optical element includes a first reflection film that has conductivity; a second reflection film that faces the first reflection film; an insulating film, having light transmittance, which is provided on a side of the first reflection film opposite to the second reflection film; and a light receiving unit which is provided on a side of the insulating film opposite to the first reflection film and within a region where the first reflection film, the second reflection film, and the insulating film overlap each other in a plan view when seen from film thickness directions of the first reflection film and the second reflection film, and which receives light emitted from the first reflection film.

As described above, in the aspect of the invention, it is possible to suppress the mixing of noise into a detection signal which is output from the light receiving unit in the optical element and to perform a light amount measurement with a high level of accuracy. For this reason, the electronic device can perform various types of processes (for example, an optical spectrum measurement process and a component analysis process based on measurement results) with a high level of accuracy on the basis of highly-accurate measurement results.

An electronic device of further another aspect of the invention includes an optical element and a control unit that controls the optical element. The optical element includes a first reflection film; a second reflection film that faces the first reflection film; a conductive film, having light transmittance, which is provided on a side of the first reflection film opposite to the second reflection film; an insulating film, having light transmittance, which is provided on a side of the conductive film opposite to the first reflection film; and a light receiving unit which is provided on a side of the insulating film opposite to the conductive film and within a region where the first reflection film, the second reflection film, the conductive film, and the insulating film overlap each other in a plan view when seen from film thickness directions of the first reflection film and the second reflection film, and which receives light emitted from the first reflection film.

As described above, in the aspect of the invention, it is possible to suppress the mixing of noise into a detection signal which is output from the light receiving unit in the optical element and to perform a light amount measurement with a high level of accuracy. For this reason, the electronic device can perform various types of processes (for example, an optical spectrum measurement process and a component analysis process based on measurement results) with a high level of accuracy on the basis of highly-accurate measurement results.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the accompanying drawings.
Configuration of Spectrometry Device FIG. 1 is a block diagram showing a schematic configuration of a spectrometry device according to the first embodiment of the invention.

A spectrometry device 1, which is an example of an electronic device according to the invention, is a device that analyzes the light intensity of each wavelength in light to be measured which is reflected from a measurement target X and that measures an optical spectrum. Meanwhile, in this embodiment, an example is described in which the light to be measured, which is reflected from the measurement target X, is measured. However, when a light-emitting body such as, for example, a liquid crystal panel is used as the measurement target X, light emitted from the light-emitting body may be used as the light to be measured.

Figure 1:
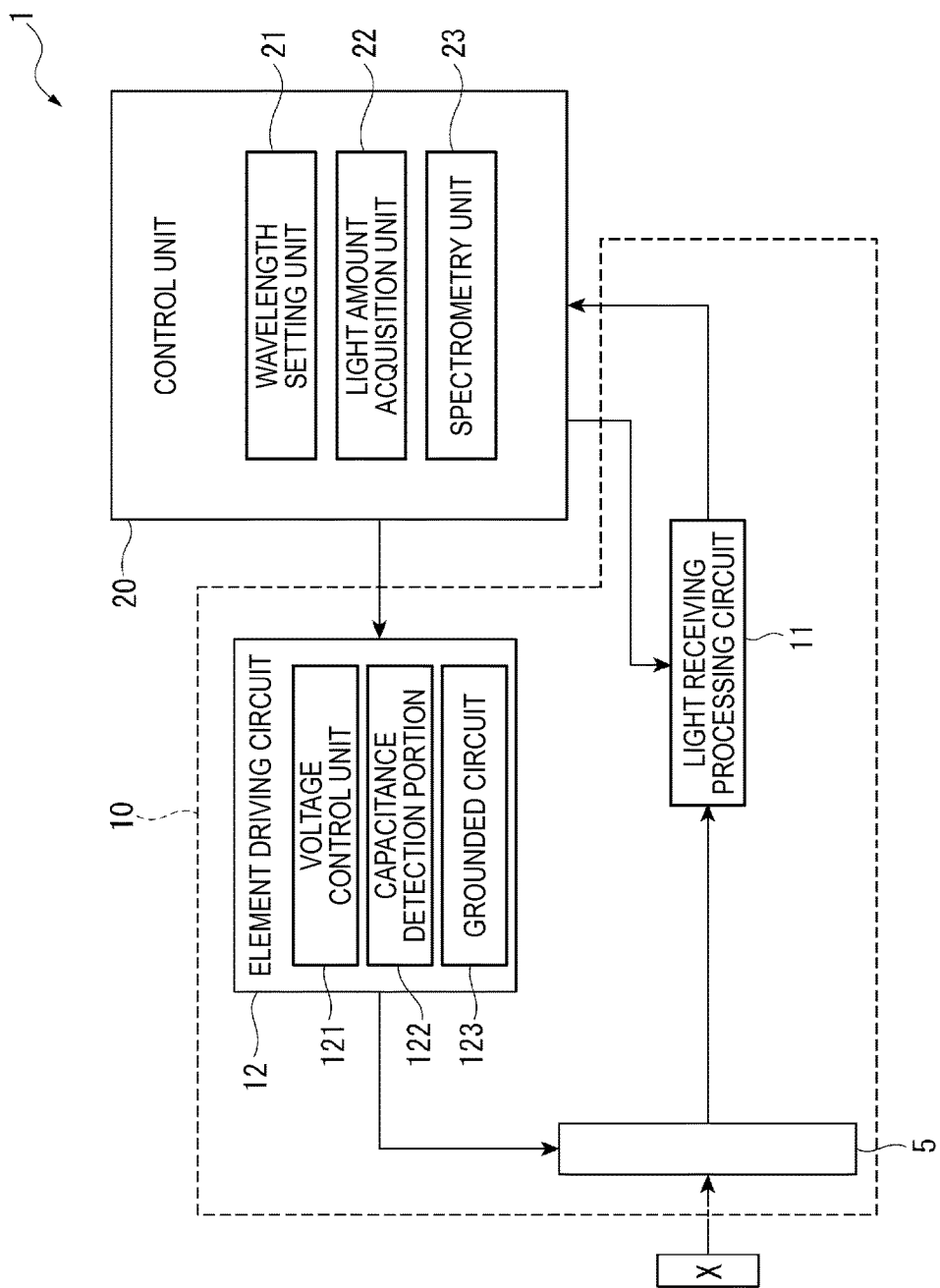
FIG. 1 is a block diagram showing a schematic configuration of a spectrometry device according to a first embodiment.

As shown in FIG. 1, the spectrometry device 1 includes an optical module 10 and a control unit 20 that processes a signal which is output from the optical module 10.
Configuration of Optical Module The optical module 10 includes an optical element 5, a light receiving processing circuit 11, and an element driving circuit 12.

Figure 2:
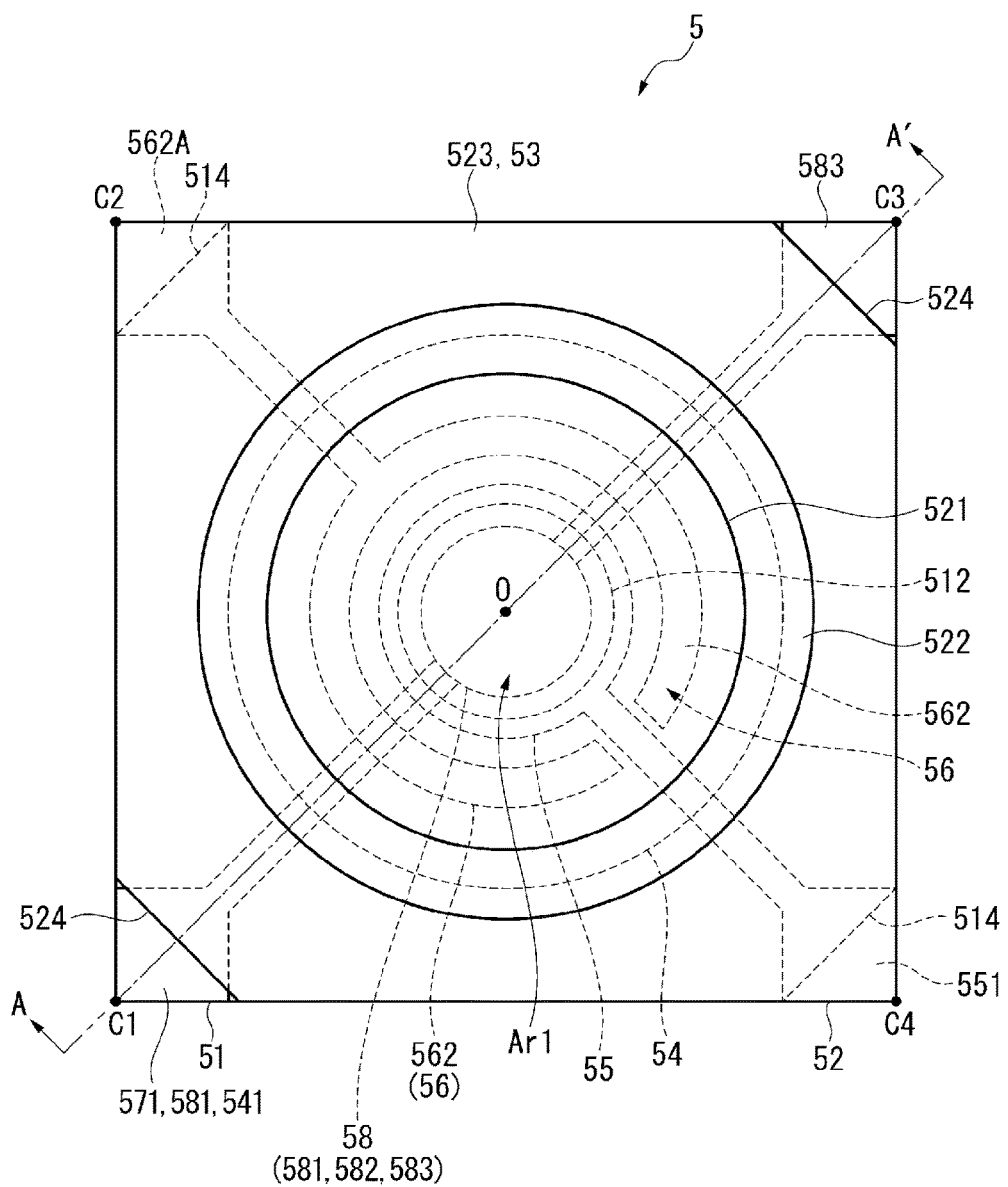
FIG. 2 is a plan view showing a schematic configuration of an optical element according to the embodiment.
Figure 3:
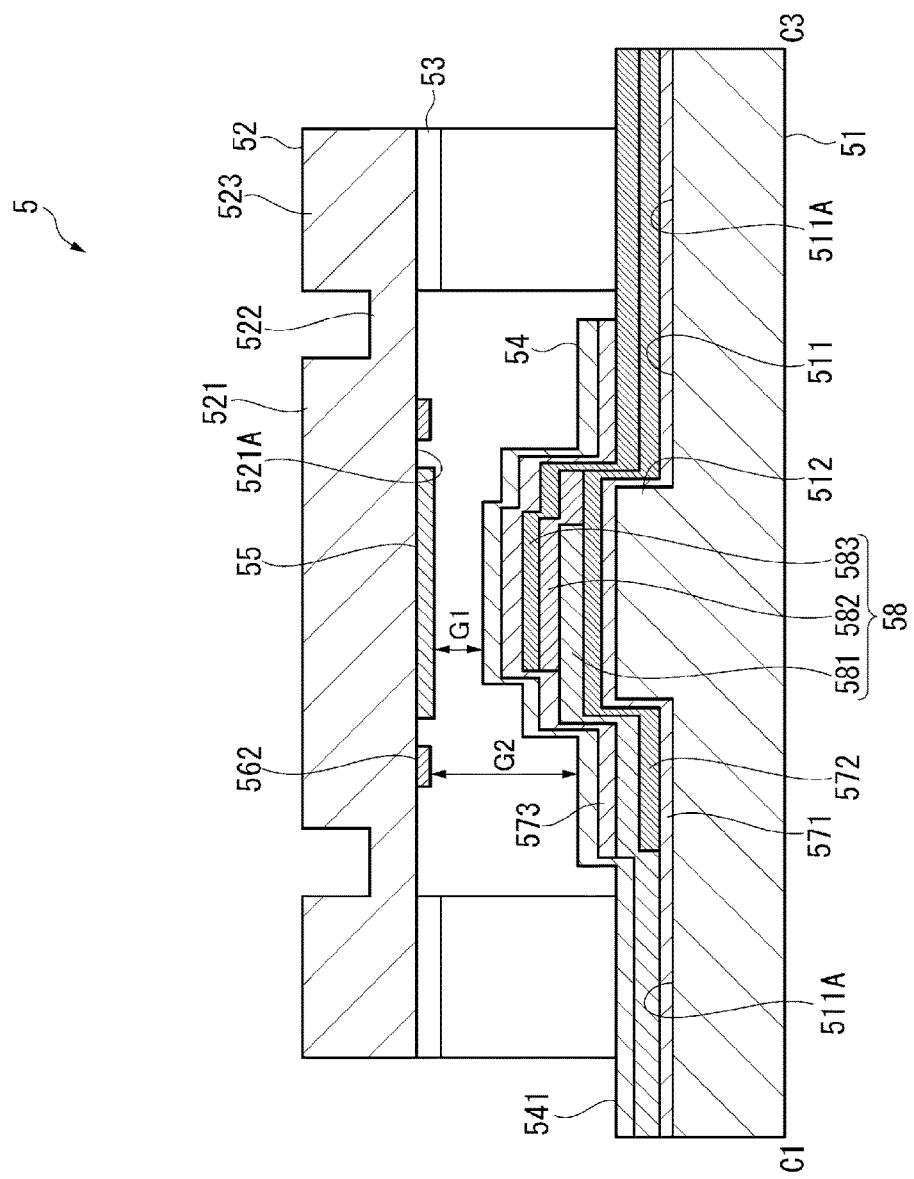
FIG. 3 is a cross-sectional view showing a schematic configuration of the optical element according to the embodiment.

The optical module 10 guides the light to be measured, which is reflected from the measurement target X, to the optical element 5 through an incident optical system (not shown). The optical element 5 selects light of a predetermined wavelength from the incident light, detects the amount of light, and outputs a detection signal based on the detected amount of light. The detection signal is output to the control unit 20 through the light receiving processing circuit 11.
Configuration of Optical Element The optical element 5 according to this embodiment will be described below. FIG. 2 is a plan view showing a schematic configuration of the optical element 5. FIG. 3 is a cross-sectional view when a wavelength variable interference filter of FIG. 2 is cut off along line A-A'.

As shown in FIGS. 2 and 3, the optical element 5, which is an optical member having, for example, a rectangular plate shape, includes a fixed substrate 51 (first substrate) and a movable substrate 52 (second substrate). The fixed substrate 51 and the movable substrate 52 are formed of insulating elements such as various types of glass and quartz crystal, respectively, and are integrally formed with each other by being bonded to each other using a bonding film 53 (see FIG. 3) which is constituted by, for example, a plasma polymerized film containing siloxane as its main component.

A light receiving unit 58 is provided on a surface (first surface) of the fixed substrate 51 which faces the movable substrate 52, and a fixed reflection film 54 constituting a first reflection film according to the invention is provided so as to cover the light receiving unit 58. In addition, the movable substrate 52 is provided with a movable reflection film 55 constituting a second reflection film according to the invention, and the reflection films 54 and 55 are disposed so as to face each other through a gap G1 (see FIG. 3). In addition, the optical element 5 is provided with an electrostatic actuator 56, and thus it is possible to change the size of the gap G1 by the electrostatic actuator 56.

That is, the optical element 5, including a Fabry-Perot etalon constituted by the fixed reflection film 54 and the movable reflection film 55, receives light passing through the Fabry-Perot etalon and having a predetermined wavelength by the light receiving unit 58 and outputs a detection signal based on the amount of light received, from the light receiving unit 58.

Meanwhile, in the following description, a plan view when seen from a substrate thickness direction of the fixed substrate 51 or the movable substrate 52, in other words, a plan view when the optical element 5 is seen from a direction in which the fixed substrate 51, the bonding film 53, and the movable substrate 52 are laminated will be referred to as an element plan view. In this embodiment, the central point of the fixed reflection film 54 conforms to the central point of the movable reflection film 55 in an element plan view, and the central points of the reflection films in a plan view will be referred to as element central points O.

Hereinafter, the configuration of each unit of the optical element 5 according to this embodiment will be described specifically.
Configuration of Fixed Substrate FIG. 4 is a plan view when the fixed substrate 51 of the optical element is seen from the movable substrate 52 side.

Figure 4:
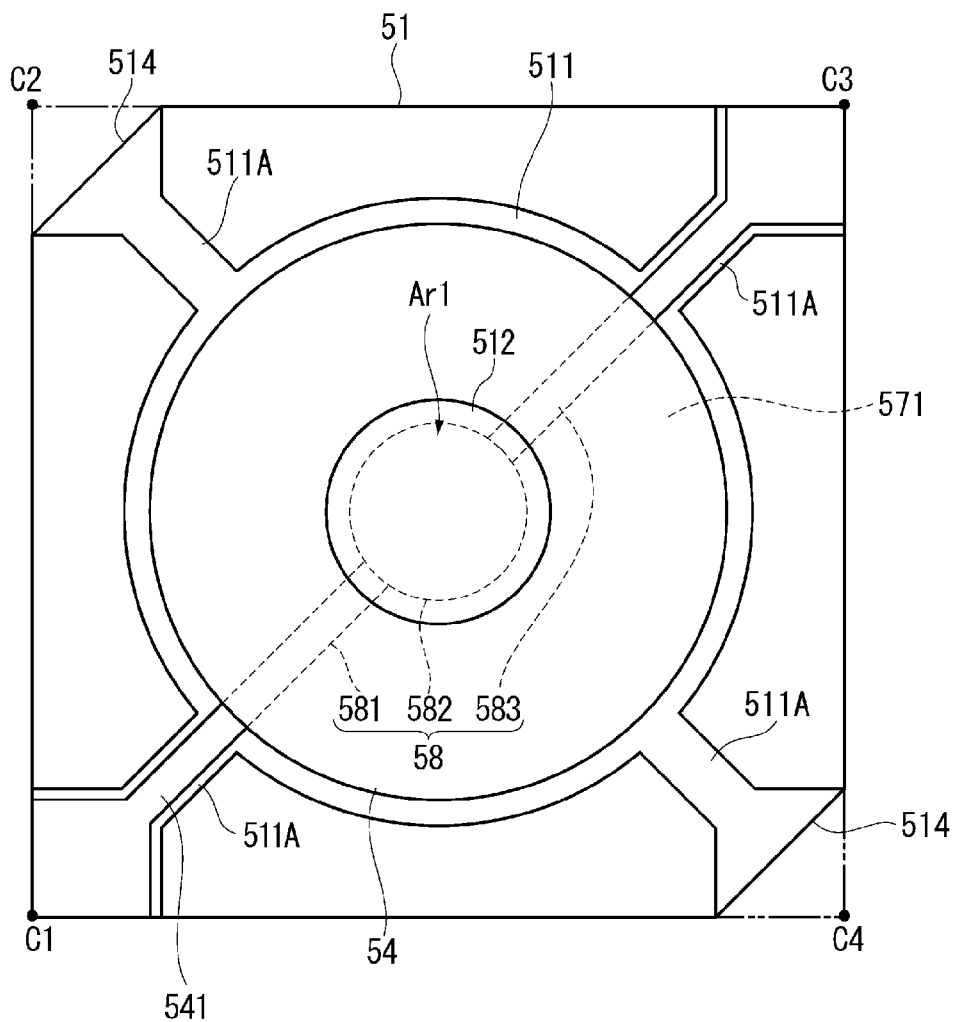
FIG. 4 is a plan view when a fixed substrate of the optical element according to the embodiment is seen from a movable substrate side.

As shown in FIGS. 3 and 4, the fixed substrate 51 includes a first groove 511 which is formed by, for example, etching, and a central protrusion portion 512 that protrudes toward the movable substrate 52 side in the center portion of the first groove 511.

The first groove 511 is formed to have a circular shape centering on the element central point O of the fixed substrate 51 in an element plan view. The central protrusion portion 512 is formed to have a columnar shape centering on the element central point O in an element plan view, and is provided with the light receiving unit 58 and the fixed reflection film 54 on the protrusion tip surface thereof.

In addition, the fixed substrate 51 is provided with a second groove 511A which is provided continuously with the first groove 511. A groove bottom surface of the second groove 511A and a groove bottom surface of the first groove 511 are located on the same plane, and the second groove extends toward vertexes C1, C2, C3, and C4 of the fixed substrate 51. In addition, the vertexes C2 and C4 of the fixed substrate 51 are provided with a notch portion 514, and portions of a movable connection electrode 562A and a movable mirror connection electrode 551, which will be described later, are exposed in a plan view when the optical element 5 is seen from the fixed substrate 51 side.

A first noise shield electrode 571 (second conductive film according to the invention) is provided on a surface of the fixed substrate 51 which faces the movable substrate. The first noise shield electrode 571 is constituted by a low reflection (light-blocking) metal such as, for example, chromium oxide.

In addition, it is preferable that the first noise shield electrode 571 cover at least a protrusion tip surface of the central protrusion portion 512. In this embodiment, the first noise shield electrode 571 is provided throughout the protrusion tip surface and the lateral surface of the central protrusion portion 512, the groove bottom surface of the first groove 511, and two second grooves 511A extending toward the vertexes C1 and C3. Meanwhile, a configuration may be given in which the first noise shield electrode 571 is also provided on the second groove 511A extending toward the vertexes C2 and C4.

A first insulating film 572 (third insulating film according to the invention) is provided on the first noise shield electrode 571. Specifically, the first insulating film 572 is provided on a region of the first noise shield electrode 571 which overlaps the protrusion tip surface and the lateral surface of the central protrusion portion 512, the first groove 511, and the second groove 511A extending toward the vertex C3. In other words, the first insulating film 572 is not provided on the first noise shield electrode 571 which is provided in the second groove 511A extending toward the vertex C1. The first insulating film 572 is formed of, for example, $SiO_2$ or $TiO_2$. Meanwhile, the insulating film is not limited to a transmissive insulating film, and a light-blocking insulating film or the like may be used.

A first light receiving connection electrode 581 constituting the light receiving unit 58 is provided on the first insulating film 572. The first light receiving connection electrode 581 is provided in a light receiving region Ar1 (circular region of FIG. 2 and FIG. 4 in this embodiment) which overlaps a light receiving element 582 to be described later in an element plan view, the light receiving region being a central region in the protrusion tip surface of the central protrusion portion 512. A portion of the first light receiving connection electrode extends toward the vertex C1. In other words, the first light receiving connection electrode 581 is provided on the first insulating film 572 in a region overlapping the central protrusion portion 512 and the first groove 511, and is provided on the first noise shield electrode 571 in a region overlapping the second groove 511A corresponding to the vertex C1. Therefore, the first noise shield electrode 571 electrically communicates with the first light receiving connection electrode 581 on the second groove 511A corresponding to the vertex C1.

For example, indium tin oxide (Sn-doped indium tin oxide: ITO) can be used as the first light receiving connection electrode 581 without particularly any problem, as long as it is a material having conductivity.

As described above, the light receiving element 582 constituting the light receiving unit 58 is provided in the light receiving region Ar1 overlapping the center portion of the protrusion tip surface of the central protrusion portion 512, on the first light receiving connection electrode 581. The light receiving element 582 is a photoelectric conversion element that outputs an electrical signal by receiving light, and can be formed of, for example, α-Si.

A second light receiving connection electrode 583 constituting the light receiving unit 58 is provided on the light receiving element 582. The second light receiving connection electrode 583 is provided in a circular region overlapping the light receiving region Ar1, and extends toward the vertex C3 from the portion thereof. In other words, the second light receiving connection electrode 583 is provided on the light receiving element 582 or the first insulating film 572 in the central protrusion portion 512, and is provided on the first insulating film 572 in a region overlapping the first groove 511 and the second groove 511A corresponding to the vertex C3. The second light receiving connection electrode 583 is connected to the light receiving processing circuit 11 in the vertex C3.

A second insulating film 573 (insulating film according to the invention) is provided on the light receiving unit 58 constituted by the first light receiving connection electrode 581, the light receiving element 582, and the second light receiving connection electrode 583 in the protrusion tip surface of the central protrusion portion 512. The second insulating film 573 is provided throughout a region ranging from the central protrusion portion 512 to the first groove 511, and covers the first light receiving connection electrode 581 and the second light receiving connection electrode 583. On the other hand, the second insulating film 573 is not provided on the second groove 511A.

The second insulating film 573 is constituted by an insulating member such as, for example, $SiO_2$ or $TiO_2$ which has light transmittance.

The fixed reflection film 54 is provided on the second insulating film 573. In this embodiment, the fixed reflection film 54 is constituted by a conductive film material, and is constituted by, for example, an alloy film such as an Ag alloy or a metal film such as an Ag film.

The fixed reflection film 54 is provided throughout a region ranging from the central protrusion portion 512 to the first groove 511, and is further provided so as to extend to the second groove 511A corresponding to the vertex C1. That is, the fixed reflection film 54 is provided so as to cover the light receiving unit 58 through the second insulating film 573. In addition, a portion (fixed mirror connection electrode 541) of the fixed reflection film 54 which corresponds to the second groove 511A corresponding to the vertex C1 is provided on the connection electrode 581. In addition, the fixed reflection film 54 covers at least a region facing a movable portion 521 of the movable substrate 52 which will be described later, in the region overlapping the first groove 511.

In this embodiment, the first noise shield electrode 571, the first light receiving connection electrode 581, and the fixed mirror connection electrode 541 of the fixed reflection film 54 are laminated on the second groove 511A corresponding to the vertex C1 and electrically communicate with each other. The fixed mirror connection electrode 541 is connected to a grounded circuit 123 of the element driving circuit 12 in the vertex C1. Thus, in this embodiment, the first noise shield electrode 571, the first light receiving connection electrode 581, and the fixed reflection film 54 are grounded, and thus are set to a reference potential (ground potential).

Configuration of Movable Substrate

Figure 5:
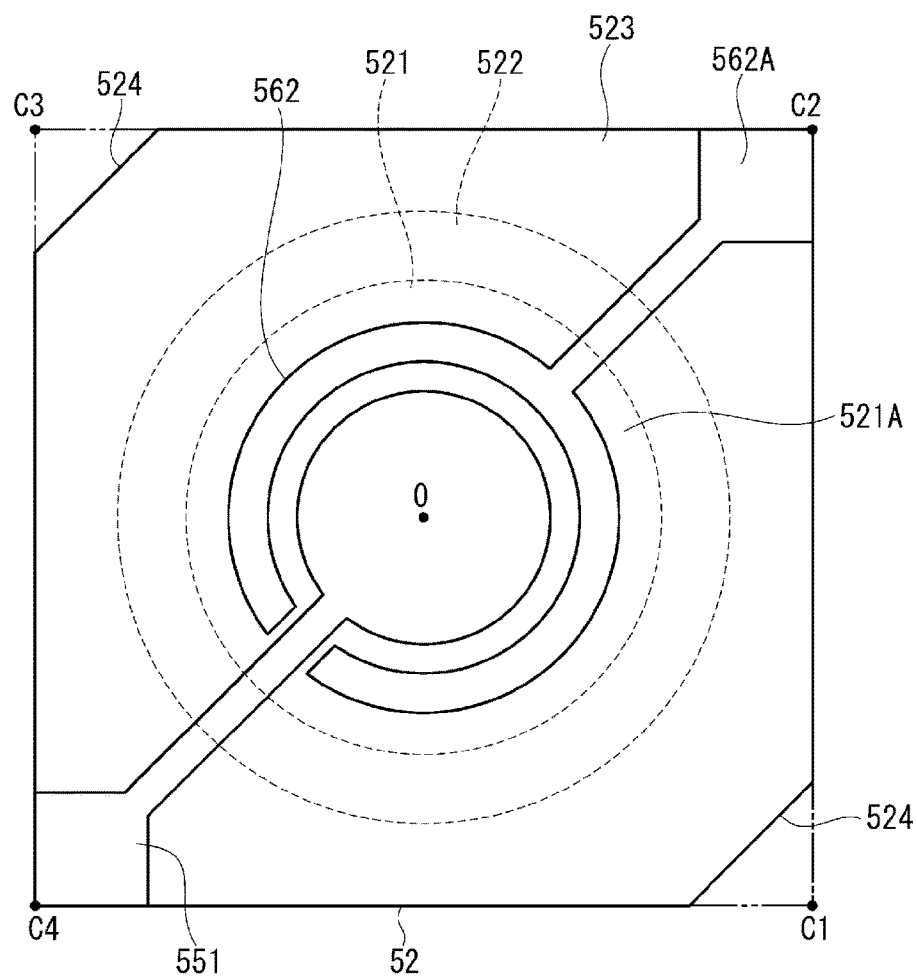
FIG. 5 is a plan view when a movable substrate of the optical element according to the embodiment is seen from the fixed substrate side.

FIG. 5 is a plan view when the movable substrate 52 is seen from the fixed substrate 51 side.

As shown in FIGS. 2, 3, and 5, the movable substrate 52 includes the movable portion 521 having a circular shape centering on the element central point O in an element plan view, a holding portion 522 which is formed coaxially with the movable portion 521 and holds the movable portion 521, and a second bonding portion 523 which is provided on the outer side of the holding portion 522. In addition, the vertexes C1 and C3 of the movable substrate 52 are provided with a notch portion 524, and a portion of the fixed reflection film 54 and a portion of the second light receiving connection electrode 583 are exposed when the optical element 5 is seen from the movable substrate 52 side.

The movable portion 521 is formed to have a thickness which is larger than that of the holding portion 522. For example, in this embodiment, the movable portion is formed to have the same thickness as that of the movable substrate 52 (second bonding portion 523). The movable portion 521 is formed to have a diameter which is larger than that of at least the outer circumferential edge of the protrusion tip surface of the central protrusion portion 12 in an element plan view. The movable reflection film 55 and a movable electrode 562 are provided on a movable surface 521A facing the fixed substrate 51 of the movable portion 521. The movable reflection film 55 may be provided directly on the movable surface 521A, or may be provided on another thin film (layer) provided on the movable surface 521A.

As shown in FIGS. 3 and 5, the movable electrode 562 is formed to have an arc shape (substantially a C shape) centering on the element central point O at a location on the first groove 511 which faces the fixed reflection film 54. Any material may be used as the movable electrode 562 as long as it is a material having conductivity. For example, a Cr/Au laminate or ITO can be used.

The movable substrate 52 is provided with the movable connection electrode 562A that extends toward the vertex C2 of the movable substrate 52 from a portion of the outer circumferential edge of the movable electrode 562. The movable connection electrode 562A is connected to a voltage control unit 121 of the element driving circuit 12.

The movable reflection film 55 is provided so as to cover at least a region of the movable surface 521A which faces the light receiving region Ar1 in an element plan view. The movable reflection film 55 is constituted by the same film material as that of the fixed reflection film 54.

In addition, the movable substrate 52 is provided with the movable mirror connection electrode 551 extending toward the vertex C4 of the movable substrate 52 from a portion of an outer circumferential portion of the movable reflection film 55. The movable mirror connection electrode 551 is connected to a capacitance detection portion 122 of the element driving circuit 12.

Meanwhile, as shown in FIG. 3, although a gap G2 between the fixed reflection film 54 and the movable electrode 562, which constitute the electrostatic actuator 56, is larger than the gap G1 between the reflection films 54 and 55 in this embodiment, the invention is not limited thereto. For example, a configuration may be given in which the gap G1 is larger than the gap G2 depending on wavelength regions of the light to be measured in a case where an infrared ray or far-infrared ray is used as the light to be measured, or the like.

The holding portion 522 is a diaphragm that surrounds the vicinity of the movable portion 521, and is formed to have a thickness which is smaller than that of the movable portion 521. The holding portion 522 has a tendency to bend further than the movable portion 521, and thus it is possible to cause the movable portion 521 to be displaced to the fixed substrate 51 side due to a slight electrostatic attractive force. At this time, since the movable portion 521 has a thickness and stiffness which are larger than those of the holding portion 522, it is possible to suppress a change in the shape of the movable portion 521 to a certain extent even when the movable portion 521 is pulled to the fixed substrate 51 side due to an electrostatic attractive force.

Meanwhile, the holding portion 522 having a diaphragm shape is illustrated in this embodiment, but the invention is not limited thereto. For example, a configuration may be given in which beam-like holding portions disposed at equal angular intervals are provided centering on the element central point O of the movable portion 521.

Configuration of Light Receiving Processing Circuit

Next, the light receiving processing circuit 11 will be described with reference to FIG. 1 again.

The light receiving processing circuit 11 is connected to the second light receiving connection electrode 583, and is constituted by an AD converter, an amplifier, or the like. The light receiving processing circuit 11 amplifies a detection signal (analog signal) which is output from the light receiving element 582 with a predetermined gain, converts the amplified signal into a digital signal, and outputs the converted signal to the control unit 20.

Configuration of Element Driving Circuit

As shown in FIG. 1, the element driving circuit 12 includes the voltage control unit 121, the capacitance detection portion 122, and the grounded circuit 123.

The voltage control unit 121 is connected to the movable connection electrode 562A, and applies a driving voltage to the electrostatic actuator 56 under the control of the control unit 20.

The capacitance detection portion 122, which is connected to the movable mirror connection electrode 551, detects the capacitance between the reflection films 54 and 55, in other words, detects the size of the gap G1.

The grounded circuit 123 is connected to the fixed mirror connection electrode 541 of the fixed reflection film 54, the first noise shield electrode 571, and the first light receiving connection electrode 581, and grounds the electrodes 541, 571, and 581.

Configuration of Control Unit

Next, the control unit 20 of the spectrometry device 1 will be described.

The control unit 20 is constituted by, for example, a combination of a CPU, a memory, and the like, and controls the overall operation of the spectrometry device 1. As shown in FIG. 1, the control unit 20 includes a wavelength setting unit 21, a light amount acquisition unit 22, and a spectrometry unit 23. In addition, the memory of the control unit 20 stores V-λ data indicating a relationship between a wavelength of light passing through the optical element 5 and a driving voltage to be applied to the electrostatic actuator 56 in response to the wavelength.

The wavelength setting unit 21 sets a target wavelength of light extracted by the optical element 5 and outputs a command signal for applying a driving voltage corresponding to the set target wavelength to the electrostatic actuator 56, to the element driving circuit 12 on the basis of the V-λ data.

The light amount acquisition unit 22 acquires the amount of light of the target wavelength which is received by the optical element 5, on the basis of the detection signal which is input from the light receiving processing circuit 11.

The spectrometry unit 23 measures spectrum characteristics of the light to be measured, on the basis of the amount of light which is acquired by the light amount acquisition unit 22.

Method of Manufacturing Optical Element

Next, a method of manufacturing the optical element 5 described above will be described with reference to the accompanying drawings.

In order to manufacture the optical element 5, the fixed substrate 51 and the movable substrate 52 are individually manufactured, and the manufactured fixed substrate 51 and movable substrate 52 are bonded to each other.

Fixed Substrate Manufacturing Process

FIGS. 6A to 6E and FIGS. 7A to 7D are diagrams showing processes of a fixed substrate forming process.

Figure 6A:
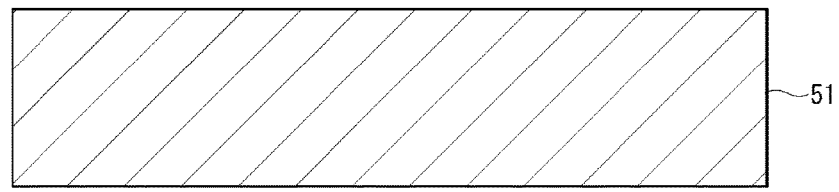
FIGS. 6A to 6E are diagrams showing processes of a process of forming the fixed substrate of the optical element according to the embodiment.

In the fixed substrate forming process, first, a quartz glass substrate, which is a material for manufacturing the fixed substrate 51, is provided. Then, as shown in FIG. 6A, both surfaces of the quartz glass substrate are precisely polished until a surface roughness Ra is set to, for example, equal to or less than 1 nm.

Then, a resist for forming the first groove 511 and the second groove 511A is applied onto the surface of the fixed substrate 51 which faces the movable substrate 52, the applied resist is exposed and developed using a photolithography method, and then patterning is performed on a location where the first groove 511, the second groove 511A, and the central protrusion portion 512 are formed. Next, the first groove 511, the second groove 511A, and the central protrusion portion 512 are etched to a desired depth (height of the protrusion tip surface of the central protrusion portion 512). Meanwhile, here, wet etching using an etching solution such as HF is used as the etching.

Figure 6B:
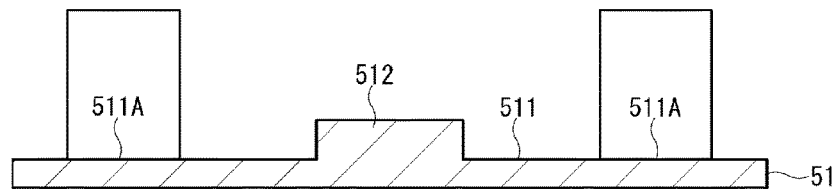

Then, a resist is formed at a location where the central protrusion portion 512 is formed, using a photolithography method, and the first groove 511 and the second groove 511A are etched to a desired depth. Thereafter, the resist is removed. Thus, the substrate shape of the fixed substrate 51 is determined as shown in FIG. 6B.

Figure 6C:
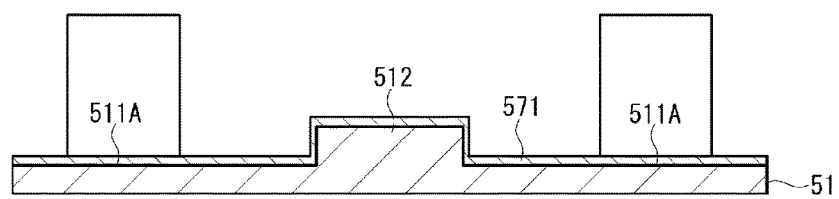

Next, a resist pattern for forming the first noise shield electrode 571 is formed on the surface of the fixed substrate 51 on which the first groove 511, the second groove 511A, and the central protrusion portion 512 are formed, using a photolithography method. In other words, the first groove 511, the central protrusion portion 512, and regions overlapping the second groove 511A corresponding to the vertexes C1 and C3 are opened, and a resist covering the other regions is formed. Then, the first noise shield electrode 571 which is, for example, a TiW/Au laminate is formed using a PVD method such as sputtering, and the resist is removed. Thus, as shown in FIG. 6C, the first noise shield electrode 571 is formed.

Figure 6D:
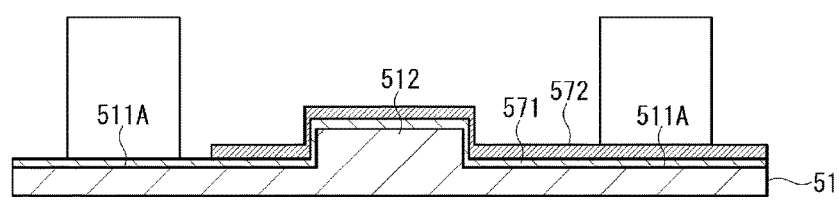
Figure 6E:
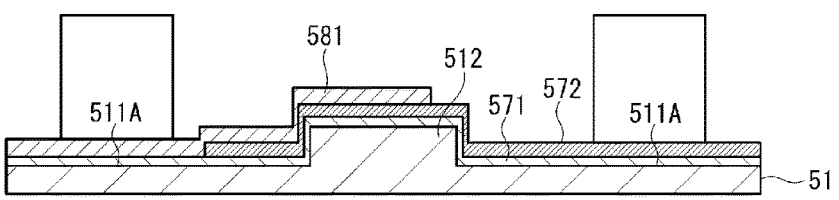

Thereafter, a resist pattern for forming the first insulating film 572 is formed using a photolithography method. In other words, the first groove 511, the central protrusion portion 512, and a region overlapping the second groove 511A corresponding to the vertex C3 are opened, and a resist covering the other regions is formed. Thereafter, an insulating member such as, for example, $SiO_2$ is formed using a PVD method such as sputtering, and the resist is removed. Thus, as shown in FIG. 6D, the first insulating film 572 is formed.

Figure 7A:
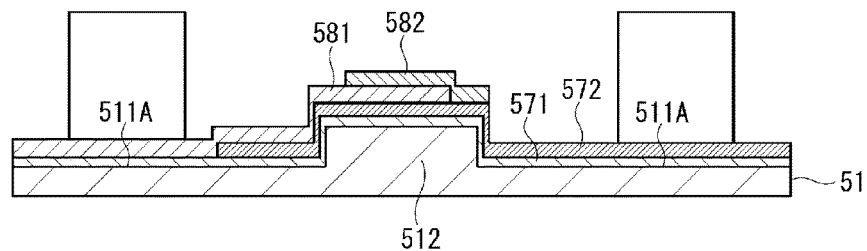
FIGS. 7A to 7D are diagrams showing processes of a process of forming the fixed substrate of the optical element according to the embodiment.

Next, a resist pattern for forming the first light receiving connection electrode 581 is formed using a photolithography method. In other words, the light receiving region Ar1, the second groove 511A corresponding to the vertex C1, and a linear region (on the first groove 511 and the central protrusion portion 512) which ranges from the light receiving region Ar1 to the vertex C1 in an element plan view are opened, and a resist covering the other regions is formed. Thereafter, a conductive film such as, for example, ITO is formed using a PVD method such as sputtering, and the resist is removed. Thus, as shown in FIG. 7A, the first light receiving connection electrode 581 is formed.

Figure 7B:
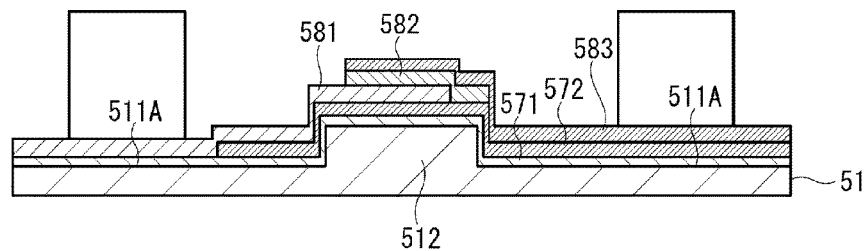

Then, a resist pattern for forming the light receiving element 582 is formed using a photolithography method. In other words, the light receiving region Ar1 is opened, and a resist covering the other regions is formed. Thereafter, for example, a photoelectric conversion element such as α-Si is formed using a PVD method such as sputtering, and the resist is removed. Thus, as shown in FIG. 7B, the light receiving element 582 is formed.

Figure 7C:
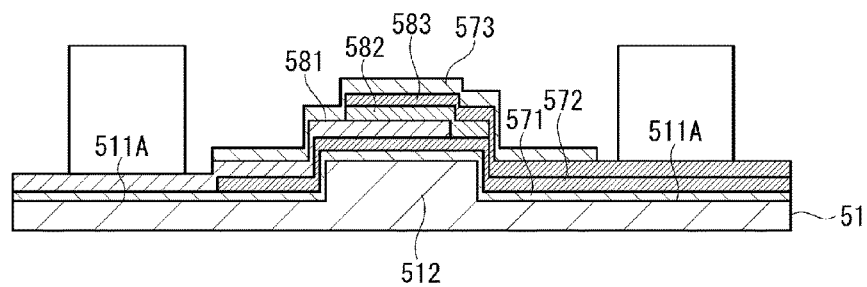

Thereafter, a resist pattern for forming the second light receiving connection electrode 583 is formed using a photolithography method. In other words, the light receiving region Ar1, the second groove 511A corresponding to the vertex C3, and a linear region (on the first groove 511 and on the central protrusion portion 512) which ranges from the light receiving region Ar1 to the vertex C3 in an element plan view are opened, and a resist covering the other regions is formed. Thereafter, a transmissive conductive film such as, for example, ITO is formed using a PVD method such as sputtering, and the resist is removed. Thus, as shown in FIG. 7C, the second light receiving connection electrode 583 is formed.

Figure 7D:
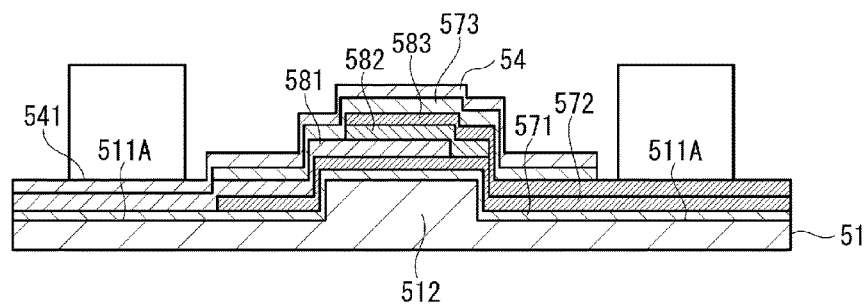

Then, a resist pattern for forming the second insulating film 573 is formed using a photolithography method. In other words, the central protrusion portion 512 and a region overlapping the first groove 511 are opened, and a resist covering the other regions is formed. Thereafter, a transmissive insulating member such as, for example, $SiO_2$ is formed using a PVD method such as sputtering, and the resist is removed. Thus, as shown in FIG. 7D, the second insulating film 573 is formed.

Finally, a resist pattern for forming the fixed reflection film 54 is formed using a photolithography method. In other words, the central protrusion portion 512, the first groove 511, and the second groove 511A corresponding to the vertex C1 are opened, and a resist covering the other regions is formed. Thereafter, a reflection film such as, for example, an Ag alloy is formed using a PVD method such as sputtering, and the resist is removed. Thus, as shown in FIG. 7D, the fixed reflection film 54 is formed.

As described above, the fixed substrate 51 is formed.

Movable Substrate Manufacturing Process

FIGS. 8A to 8D are diagrams showing processes of a movable substrate manufacturing process.

Figure 8A:
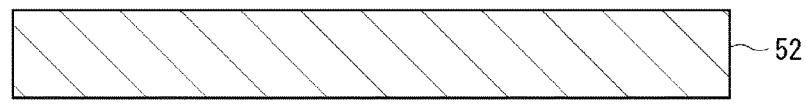
FIGS. 8A to 8D are diagrams showing processes of a process of forming the movable substrate of the optical element according to the embodiment.

First, a quartz glass substrate which is a material for forming the movable substrate 52 is prepared, and both surfaces of the quartz glass substrate are precisely polished until a surface roughness Ra of the glass substrate is set to equal to or less than 1 nm as shown in FIG. 8A.

Figure 8B:
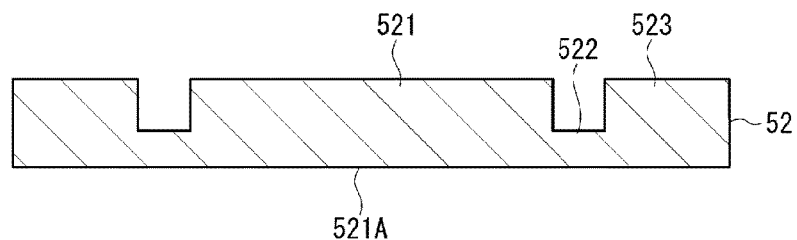

Then, a resist is applied onto the entire surface of the movable substrate 52, and the applied resist is exposed and developed using a photolithography method, thereby forming a resist pattern in which a region corresponding to the holding portion 522 is opened. Then, wet etching is performed on the quartz glass substrate, and thus the movable portion 521 and the holding portion 522 are formed as shown in FIG. 8B.

Figure 8C:
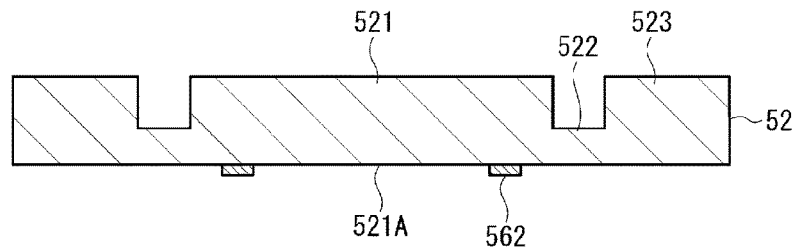

Thereafter, the resist is removed, and a resist pattern for forming the movable electrode 562 is formed using a photolithography method. Then, for example, a TiW/Au laminate is formed using a PVD method such as sputtering, and the resist is removed. Thus, as shown in FIG. 8C, the movable electrode 562 is formed.

Figure 8D:
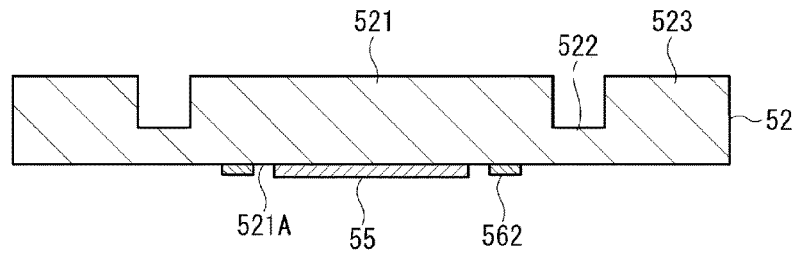

Next, a resist pattern for forming the movable reflection film 55 is formed using a photolithography method. Then, a reflection film such as an Ag alloy is formed using a PVD method such as sputtering, and the resist is removed. Thus, as shown in FIG. 8D, the movable reflection film 55 is formed.

As described above, the movable substrate 52 is formed.

Bonding Process

Next, the substrates 51 and 52, which are formed in the fixed substrate manufacturing process and the movable substrate manufacturing process described above, are bonded to each other. Specifically, the bonding film 53 is formed on the bonding surface of each of the substrates 51 and 52. Meanwhile, the bonding film 53 is formed in such a manner that a bonding surface is opened using, for example, a photolithography method, a resist covering the other regions is formed, and a plasma polymerized film is formed using a PVD method such as sputtering.

Thereafter, $O_2$ plasma treatment or UV treatment is performed in order to apply activation energy to the plasma polymerized film constituting the bonding film 53. The $O_2$ plasma treatment is performed for 30 seconds under the conditions of an $O_2$ flow rate of 30 cc per minute, a pressure of 27 Pa, and an RF power of 200 W. In addition, the UV treatment is performed for three minutes using excimer UV (wavelength of 172 nm) as a UV light source. After the activation energy is applied to the plasma polymerized film, alignment between the two substrates 51 and 52 is performed so that the bonding surface of the fixed substrate 51 overlaps the bonding surface of the movable substrate 52 in a filter plan view. Then, the substrates 51 and 52 are superimposed on each other through the bonding films 53 of the bonding surfaces, and a load is applied to the bonded portions, thereby bonding the substrates 51 and 52 to each other.

Operational Effects of First Embodiment

In the optical element 5 according to this embodiment, the light receiving unit 58 is provided on the surface of the fixed substrate 51 which faces the movable substrate 52, and the conductive fixed reflection film 54 is provided in the light receiving region Ar1 overlapping the light receiving unit 58 through the second insulating film 573. In the movable substrate 52, the movable reflection film 55 is provided in a region overlapping the light receiving region Ar1, and a Fabry-Perot etalon is constituted by the fixed reflection film 54 and the movable reflection film 55.

In such a configuration, the fixed reflection film 54 has conductivity, and the second insulating film 573 is provided between the fixed reflection film 54 and the light receiving unit 58. Thus, the fixed reflection film 54 functions as a shield electrode that shields noise, and thus can suppress the input of electrical noise to the light receiving unit 58.

In addition, a distance between the fixed reflection film 54 and the light receiving unit 58 corresponds to the thickness of the second insulating film 573, and thus it is possible to suppress the incidence of stray light on the light receiving unit 58, for example, as compared with a configuration in which the light receiving unit 58 is provided outside the optical element 5.

As described above, it is possible to suppress a disadvantage that electrical noise and noise components caused by stray light are mixed into the detection signal which is output from the light receiving unit 58, and to detect the amount of light of a desired wavelength based on the size of the gap G1 between the reflection films 54 and 55 with a high level of accuracy.

Therefore, even in the spectrometry process in the spectrometry device 1, it is possible to perform an accurate spectrometry of a measurement target on the basis of the amount of light which is acquired with a high level of accuracy.

In this embodiment, the movable electrode 562 is provided so as to face the fixed reflection film 54. For this reason, it is possible to cause the fixed reflection film 54 and the movable electrode 562 to function as the electrostatic actuator 56, and to set the gap G1 to have a desired size by causing the movable portion 521 to be displaced to the fixed substrate 51 side. At this time, the movable reflection film 55 is connected to the capacitance detection portion 122 by the movable mirror connection electrode 551, and thus it is possible to control the gap with a high level of accuracy by detecting capacitance between the reflection films 54 and 55.

As described above, even when the fixed reflection film 54 functions as a driving electrode, the fixed reflection film 54 is grounded, and a reference potential (ground potential) is set. Thus, it is possible to suppress a disadvantage that electrical noise is input to the light receiving unit 58 from the fixed reflection film 54.

In this embodiment, the first noise shield electrode 571 is provided between the light receiving unit 58 and the fixed substrate 51, and the first insulating film 572 is provided between the first noise shield electrode 571 and the light receiving unit 58. Therefore, it is also possible to suppress a disadvantage that electrical noise input from the opposite side to the fixed reflection film 54 is input to the light receiving unit 58, using the first noise shield electrode 571.

In addition, the first noise shield electrode 571 is constituted by a low-reflection metal having a light-blocking property. For this reason, it is possible to suppress a disadvantage that light going around the reflection films 54 and 55 in light incident on the optical element 5 is reflected from the first noise shield electrode 571 and is incident on the light receiving unit 58. Therefore, it is possible to reduce noise caused by stray light.

In this embodiment, the first noise shield electrode 571, the first light receiving connection electrode 581, and the fixed mirror connection electrode 541 of the fixed reflection film 54 are laminated in the second groove 511A corresponding to the vertex C1 and electrically communicate with each other. The fixed reflection film 54 is connected to the grounded circuit 123, and the electrodes 571, 581, and 541 are set to a reference potential (ground potential).

Therefore, it is possible to allow the electrical noise input to the fixed reflection film 54 and the first noise shield electrode 571 to escape to the grounded circuit 123. In addition, the fixed reflection film 54 and the first light receiving connection electrode 581 can be used in common as a reference potential, and thus it is possible to achieve a reduction in the number of wiring connections and to simplify the configuration.

Second Embodiment

Next, a second embodiment according to this embodiment will be described with reference to the accompanying drawings.

In the first embodiment described above, an example is described in which the fixed reflection film 54 and the movable reflection film 55 are constituted by a conductive reflection film (for example, an Ag alloy) and in which the fixed reflection film 54 functions as a noise shield electrode.

On the other hand, the second embodiment is different from the first embodiment in that another electrode for shielding noise is provided using a film material (for example, a dielectric multilayer film) which does not have conductivity as a reflection film.

Figure 9:
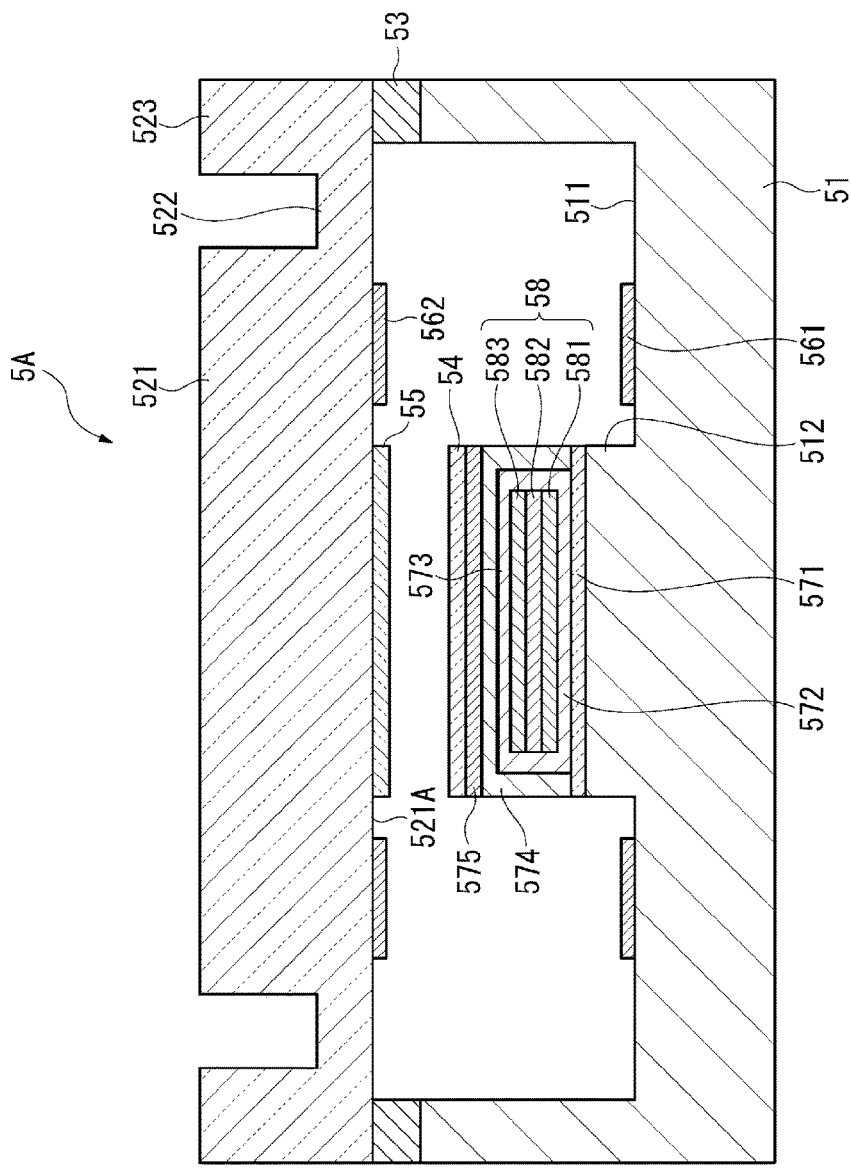
FIG. 9 is a cross-sectional view showing a schematic configuration of an optical element according to a second embodiment.

FIG. 9 is a cross-sectional view showing a schematic configuration of an optical element according to this embodiment. Meanwhile, the description of the same configuration as those in the first embodiment will be omitted or simplified.

In an optical element 5A according to this embodiment, a dielectric multilayer film is used as a fixed reflection film 54 and a movable reflection film 55. Therefore, the reflection films 54 and 55 cannot be used as electrodes, and thus another noise shield electrode or a driving electrode is provided.

Configuration of Fixed Substrate

In a fixed substrate 51 according to this embodiment, a fixed electrode 561 constituting an electrostatic actuator 56 is provided on a first groove 511. The fixed electrode 561 is provided at a location facing a movable electrode 562 which is provided in a movable substrate 52. Meanwhile, although not shown in the drawing, a fixed connection electrode connected to the fixed electrode 561 is provided in the fixed substrate 51, for example, along a second groove 511A corresponding to a vertex C1, and is connected to a voltage control unit 121 of an element driving circuit 12 in the vertex C1.

In this embodiment, the first noise shield electrode 571 is provided on a protrusion tip surface of a central protrusion portion 512. Therefore, the first noise shield electrode 571 does not electrically communicate with the fixed electrode 561. Meanwhile, although not shown in the drawing, the first noise shield electrode 571 extends up to, for example, a vertex C3 along the second groove 511A corresponding to the vertex C3, and is connected to a grounded circuit 123 of the element driving circuit 12 in the vertex C3.

A first insulating film 572 is provided on the first noise shield electrode 571, a light receiving unit 58 is provided thereon, and a second insulating film 573 is provided so as to cover the light receiving unit 58.

A second noise shield electrode 574, which is a conductive film according to the invention, is provided so as to cover the first insulating film 572, the light receiving unit 58, and the second insulating film 573.

The second noise shield electrode 574 covers the first insulating film 572 and the second insulating film 573, and the end of the second noise shield electrode is connected to the first noise shield electrode 571. Therefore, the second noise shield electrode 574 is connected to the grounded circuit 123 through the first noise shield electrode 571.

In addition, a conductive member having light transmittance such as, for example, ITO can be used as the second noise shield electrode 574.

The fixed reflection film 54 is provided on the second noise shield electrode 574 through a third insulating film 575 which is an insulating film according to the invention.

Meanwhile, the configuration of the movable substrate 52 is the same as that in the first embodiment except that the movable reflection film 55 is constituted by a dielectric multilayer film and that a movable mirror connection electrode 551 is not connected to the movable reflection film 55, and the description thereof will not be given here.

In addition, a transparent electrode (fixed mirror electrode) such as ITO may be provided on the fixed reflection film 54 so as to function as a capacitance detection electrode or the like as in the first embodiment. In this case, a configuration is given in which a movable mirror connection electrode such as ITO is also provided on the movable reflection film 55. In this manner, even when an electrode is provided on the reflection films 54 and 55, the third insulating film 575 is provided, and thus the electrode does not electrically communicate with the second noise shield electrode 574. Therefore, it is possible to suppress a disadvantage that electrical noise is input to the light receiving unit 58, using the second noise shield electrode 574.

Operational Effects of Second Embodiment

In this embodiment, the second noise shield electrode 574 and the second insulating film 573 are provided between the fixed reflection film 54 and the light receiving unit 58. Therefore, similar to the first embodiment, even when electrical noise is input from the fixed reflection film 54 side, it is possible to suppress the input of the electrical noise to the light receiving unit 58, using the second noise shield electrode 574.

In addition, a distance between the fixed reflection film 54 and the light receiving unit 58 is short, and thus it is possible to suppress a disadvantage that, for example, stray light going around the fixed reflection film 54 is incident on the light receiving unit 58, and to reduce noise caused by the stray light.

In this embodiment, the third insulating film 575 is provided between the fixed reflection film 54 and the second noise shield electrode 574.

In such a configuration, for example, even when an electrode such as ITO is formed on the outermost surface of the fixed reflection film 54 in order to use the fixed reflection film 54 as an electrode, an electrical signal is not input to the electrode by the second noise shield electrode. In addition, even when a driving signal is input to an electrode on the fixed reflection film 54, the electrical noise is shielded by the second noise shield electrode 574, and thus the input of the electrical noise to the light receiving unit 58 is suppressed.

Third Embodiment

Next, a third embodiment of the invention will be described with reference to the accompanying drawings.

In the spectrometry device 1 according to the first embodiment, a configuration is given in which the optical element 5 is directly provided with respect to the optical module 10. However, some optical modules have a complex configuration. Particularly, it may be difficult to directly provide the optical element 5 with respect to a miniaturized optical module. In this embodiment, a description will be given below of an optical device allowing the optical element 5 to be easily provided with respect to such an optical module. Meanwhile, in this embodiment, an example is described in which the optical element 5 according to the first embodiment is accommodated within a housing, but a configuration may be given in which the optical element 5A according to the second embodiment is accommodated.

Figure 10:
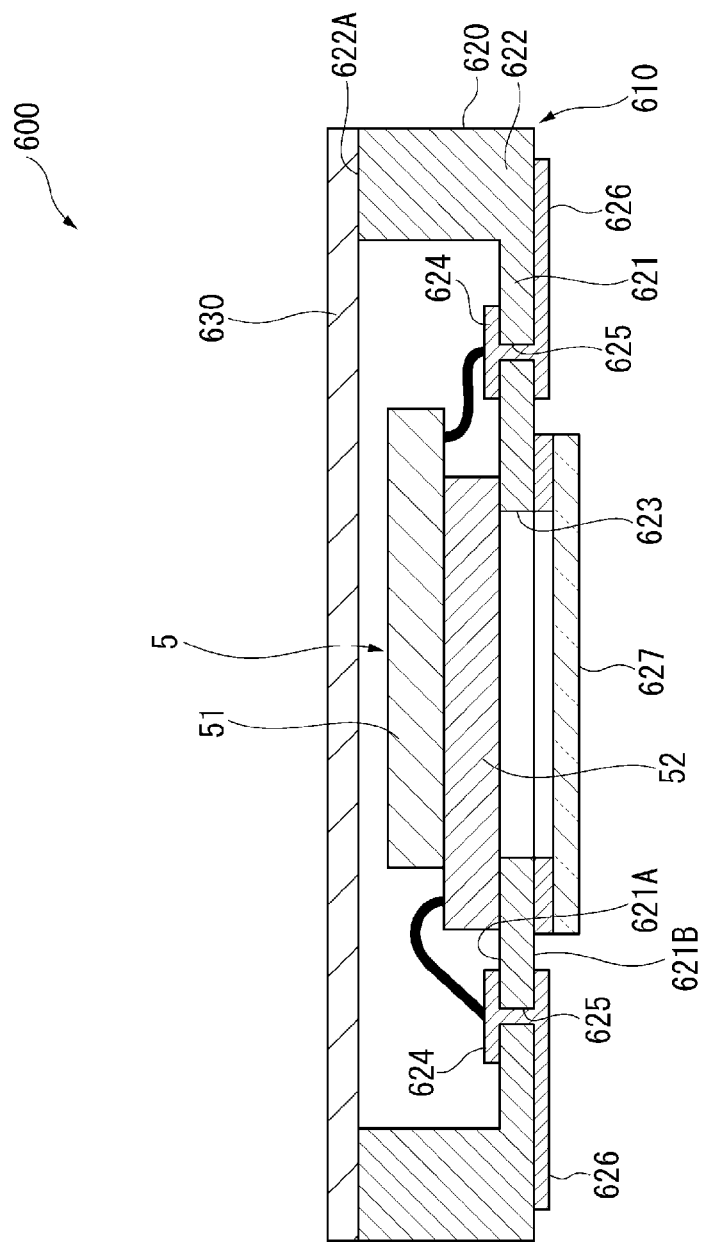
FIG. 10 is a cross-sectional view showing a schematic configuration of an optical device according to a third embodiment.

FIG. 10 is a cross-sectional view showing a schematic configuration of the optical device according to the third embodiment of the invention.

As shown in FIG. 10, an optical device 600 includes a housing 610 and an optical element 5 which is accommodated within the housing 610.

As shown in FIG. 10, the housing 610 includes a base 620 and a lid 630. An accommodation space is formed inside thereof by bonding the base 620 and the lid 630 to each other, and the optical element 5 is accommodated within the accommodation space.

Configuration of Base

The base 620 is formed of, for example, ceramic. The base 620 includes a pedestal portion 621 and a side wall portion 622.

The pedestal portion 621 is formed to have, for example, a flat plate shape having a rectangular outline in a filter plan view. The side wall portion 622 having a tubular shape stands toward the lid 630 from an outer circumferential portion of the pedestal portion 621.

The pedestal portion 621 includes an opening portion 623 passing in a thickness direction. In a state where the opening portion 623 accommodates the optical element 5 in the pedestal portion 621, the opening portion is provided so as to include a region overlapping reflection films 54 and 55 in a plan view when the pedestal portion 621 is seen from the thickness direction.

In addition, a glass member 627 covering the opening portion 623 is bonded to a surface (base outer surface 621B) of the pedestal portion 621 which is opposite to the lid 630. For example, the bonding between the pedestal portion 621 and the glass member 627 can be performed by low-melting-point glass bonding in which a glass raw material is melted at a high temperature and pieces of glass frit (low-melting-point glass) which are fragments of rapidly cooled glass are used, bonding using an epoxy resin, or the like. In this embodiment, the accommodation space is maintained in an airtight manner in a state where the accommodation space is maintained under reduced pressure. Therefore, it is preferable that the pedestal portion 621 and the glass member 627 be bonded to each other by low-melting-point glass bonding.

In addition, an inner terminal portion 624 which is connected to the fixed mirror connection electrode 541 (the first noise shield electrode 571 and the first light receiving connection electrode 581) of the optical element 5, the movable connection electrode 562A, and the movable mirror connection electrode 551, is provided on an inner surface (base inner surface 621A) of the pedestal portion 621 which faces the lid 630. The inner terminal portion 624 and the electrodes 541, 551, and 562A are connected to each other using a wire such as Au by, for example, wire bonding. Meanwhile, although wire bonding is illustrated in this embodiment, for example, a flexible printed circuit (FPC) may be used.

In the pedestal portion 621, a through hole 625 is formed at a location where the inner terminal portion 624 is provided. The inner terminal portion 624 is connected to an outer terminal portion 626 provided on the base outer surface 621B of the pedestal portion 621 through the through hole 625.

The side wall portion 622 stands from an edge portion of the pedestal portion 621 and covers the vicinity of the optical element 5 mounted on the base inner surface 621A. A surface (end face 622A) of the side wall portion 622 which faces the lid 630 serves as a planar surface which is parallel to, for example, the base inner surface 621A.

The optical element 5 is fixed to the base 620 using a fixed member such as, for example, an adhesive. At this time, the optical element 5 may be fixed to the pedestal portion 621 or may be fixed to the side wall portion 622. The number of locations where the fixed member is provided may be two or more. However, it is preferable that the optical element 5 be fixed at one location in order to suppress the transfer of stress of the fixed member to the optical element 5.

Configuration of Lid

The lid 630 is a transparent member having a rectangular outline in a plan view and is constituted by a non-transmissive member such as, for example, a metal plate.

As shown in FIG. 10, the lid 630 is bonded to the side wall portion 622 of the base 620. Examples of the bonding method include bonding using low-melting-point glass, welding, and the like.

Operational Effects of Third Embodiment

In the above-described optical device 600 according to this embodiment, the optical element 5 is protected by the housing 610, and thus it is possible to prevent the optical element 5 from being damaged due to external factors.

Other Embodiments

Meanwhile, the invention is not limited to the above-mentioned embodiments, and changes, modifications and the like within the range capable of achieving the object of the invention are included in the invention.

In the first embodiment, an example is described in which the first noise shield electrode 571 is formed in the first groove 511, the central protrusion portion 512, and the second groove 511A corresponding to the vertexes C1 and C2. However, for example, the first noise shield electrode may be formed in the entirety of the surface of the fixed substrate 51 which faces the movable substrate 52.

Similarly, the first insulating film 572 may also be formed in the entirety other than a portion (portion to be contacted for electrical communication between the first noise shield electrode 571 and the first light receiving connection electrode 581) of the vertex C1.

In the first embodiment, the fixed reflection film 54 is used as an electrode of the electrostatic actuator 56 on the fixed substrate 51 side, but is not limited thereto. For example, as in the second embodiment, another fixed electrode 561 may also be provided. In this case, as long as the fixed electrode 561 is electrically insulated from the fixed reflection film 54, it is possible to set a predetermined potential in the fixed electrode 561 and to move the movable portion 521 using a potential difference from the movable electrode 562. In addition, the fixed electrode 561 may be provided on the fixed reflection film 54, and electrical communication may be performed therebetween. In this case, similarly to the first embodiment, it is preferable that the fixed electrode 561 be grounded.

In the second embodiment, the first noise shield electrode 571 may function as a driving electrode. In addition, the second noise shield electrode 574 may be formed throughout a region ranging from the central protrusion portion 512 to the first groove 511, and the second noise shield electrode 574 may function as a driving electrode.

In the above-described embodiments, an example is described in which the fixed substrate 51 is constituted by a transparent substrate such as glass, but the fixed substrate may be constituted by a substrate having a light-blocking property with respect to a wavelength region to be measured. For example, in a spectrometry device, when the spectrometry of a visible light region is performed, the incidence of external light can be suppressed by using an Si substrate as the fixed substrate 51, and thus it is possible to perform measurement in which noise components are reduced, with a higher level of accuracy.

In the above-described embodiments, an example is described in which the first noise shield electrode 571 is constituted by a conductive film having a light-blocking property, but the invention is not limited thereto. For example, as described in the third embodiment, when the fixed substrate 51 side is fixed to the pedestal portion 621 of a light-blocking optical device, the conductive film may not have a light-blocking property. However, light incident from the movable substrate 52 side may be reflected from the first noise shield electrode 571 and may be input to the light receiving unit 58, and thus it is preferable that the first noise shield electrode be constituted by a light-blocking conductive film as in the above-described embodiments.

In addition, even when the first noise shield electrode 571 does not have a light-blocking property, the first insulating film 572 may be constituted by an insulating member having a light-blocking property. Even in this case, it is possible to suppress the incidence of stray light on the light receiving unit 58 and to reduce noise components caused by stray light.

In the first embodiment, an example is described in which the movable electrode 562 is provided outside the movable reflection film 55 (further outside than the light receiving region Ar1), but the invention is not limited thereto. For example, the movable electrode 562 constituted by a transparent electrode such as ITO may be provided on the movable reflection film 55. In addition, the movable reflection film 55 is used as an electrode for capacitance detection. However, for example, the movable mirror connection electrode 551 is connected to the voltage control unit 121, and thus may be used as a driving electrode. Even in this case, the fixed reflection film 54 functions as a noise shield electrode, and thus it is possible to suppress a disadvantage that noise caused by a driving voltage is input to the light receiving unit 58.

In the second embodiment, a configuration is illustrated in which the fixed electrode 561 facing the movable electrode 562 is provided, but the invention is not limited thereto.

For example, the second noise shield electrode 574 may be formed throughout a region ranging from the central protrusion portion 512 to a region of the first groove 511 which faces the movable electrode 562, and the electrostatic actuator 56 may be constituted by the second noise shield electrode 574 and the movable electrode 562.

In the above-described embodiments, the spectrometry device 1 is illustrated as the electronic device according to the invention. However, besides, the optical module and the electronic device according to the invention can be applied in various fields.

Figure 11:
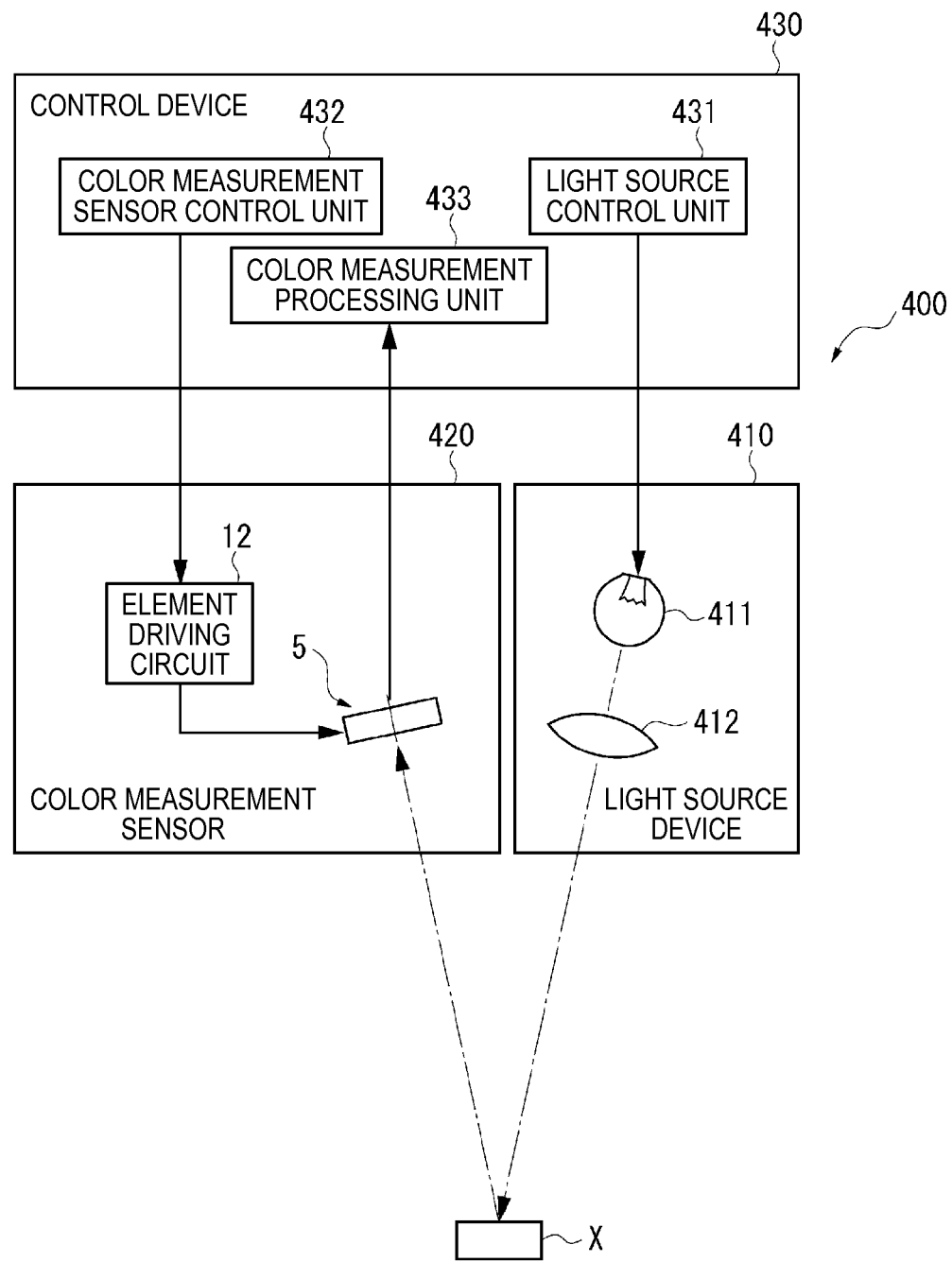
FIG. 11 is a block diagram showing a schematic configuration of a color measuring device which is another example of an electronic device according to the invention.

For example, as shown in FIG. 11, the electronic device according to the invention can be applied to a color measuring device for measuring colors.

FIG. 11 is a block diagram showing an example of a color measuring device 400 including a wavelength variable interference filter.

As shown in FIG. 11, the color measuring device 400 includes a light source device 410 that emits light to a measurement target X, a color measurement sensor 420 (optical module), and a control device 430 that controls the overall operation of the color measuring device 400. The color measuring device 400 is a device that causes light emitted from the light source device 410 to be reflected from the measurement target X, causes the reflected light, which is to be inspected, to be received by the color measurement sensor 420, and analyzes and measures chromaticity of the to-be-inspected light, that is, the color of the measurement target X on the basis of a detection signal which is output from the color measurement sensor 420.

The color measuring device includes a light source device 410, a light source 411, and a plurality of lenses 412 (only one is shown in FIG. 11), and emits, for example, reference light (for example, white light) to the measurement target X. In addition, each of the plurality of lenses 412 may include a collimator lens. In this case, the light source device 410 makes the reference light emitted from the light source 411 become parallel light using the collimator lens, and emits the parallel light toward the measurement target X from a projection lens not shown in the drawing. Meanwhile, in this embodiment, the color measuring device 400 including the light source device 410 is illustrated. However, for example, when the measurement target X is a light-emitting member such as a liquid crystal panel, a configuration may be given in which the light source device 410 is not provided.

As shown in FIG. 11, the color measurement sensor 420 includes the optical element 5 and the element driving circuit 12 which is capable of changing a wavelength of light received by the optical element 5. In addition, the color measurement sensor 420 includes an incident optical lens, not shown in the drawing, which guides light (to-be-inspected light) reflected from the measurement target X to the inside thereof, at a location facing the optical element 5. The color measurement sensor 420 spectroscopically disperses light of a predetermined wavelength in the to-be-inspected light which is incident from the incident optical lens, and outputs a detection signal based on the amount of light spectroscopically dispersed, by the optical element 5. Meanwhile, a configuration may be given in which the optical element 5A or the optical device 600 is provided instead of the optical element 5.

The control device 430 controls the overall operation of the color measuring device 400.

For example, a general-purpose personal computer, a portable information terminal, a color measurement-only computer, or the like can be used as the control device 430. As shown in FIG. 11, the control device 430 is configured to include a light source control unit 431, a color measurement sensor control unit 432, a color measurement processing unit 433, and the like.

The light source control unit 431 is connected to the light source device 410 and outputs a predetermined control signal to the light source device 410 on the basis of, for example, a user's setting input to thereby emit white light having a predetermined brightness.

The color measurement sensor control unit 432 is connected to the color measurement sensor 420, sets a wavelength of light received by the color measurement sensor 420 on the basis of, for example, a user's setting input, and outputs a control signal for detecting the amount of light received which has the wavelength to the color measurement sensor 420. Thus, the element driving circuit 12 of the color measurement sensor 420 applies a voltage to the electrostatic actuator 56 on the basis of the control signal to thereby drive the optical element 5.

The color measurement processing unit 433 analyzes the chromaticity of the measurement target X on the basis of the detection signal based on the amount of light which is detected by the optical element 5.

In addition, other examples of the electronic device according to the invention include a light-based system for detecting the presence of a specific material. Examples of such a system can include a gas detection device such as, for example, an in-car gas leakage detector which detects a specific gas with high sensitivity by adopting a spectroscopic measurement method using the optical element according to the invention, and a photoacoustic noble gas detector for exhalation inspection.

An example of such a gas detection device will be described below with reference to the accompanying drawings.

Figure 12:
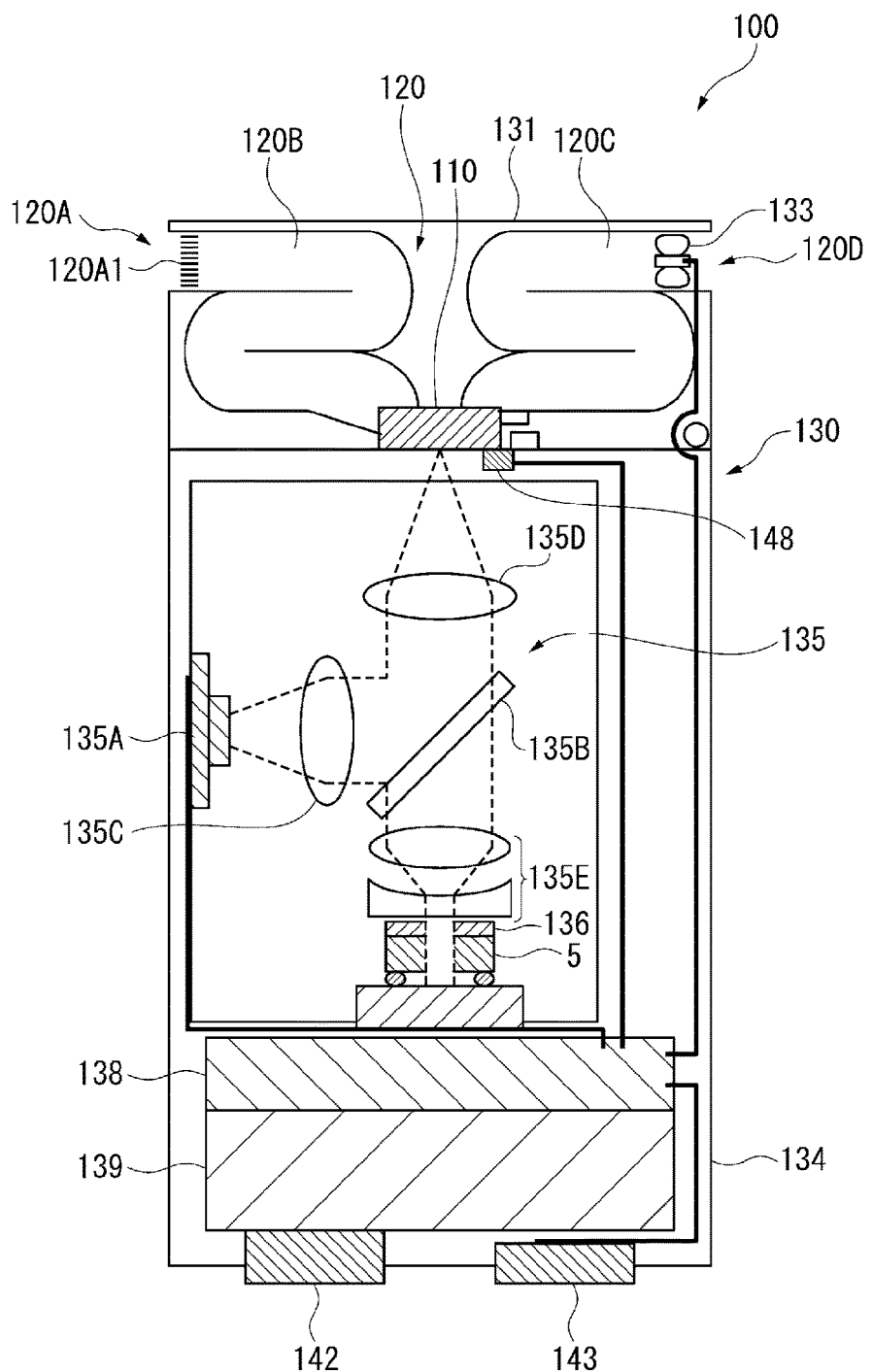
FIG. 12 is a schematic diagram of a gas detection device which is another example of the electronic device according to the invention.

FIG. 12 is a schematic diagram showing an example of a gas detection device including the optical module according to the invention.

Figure 13:
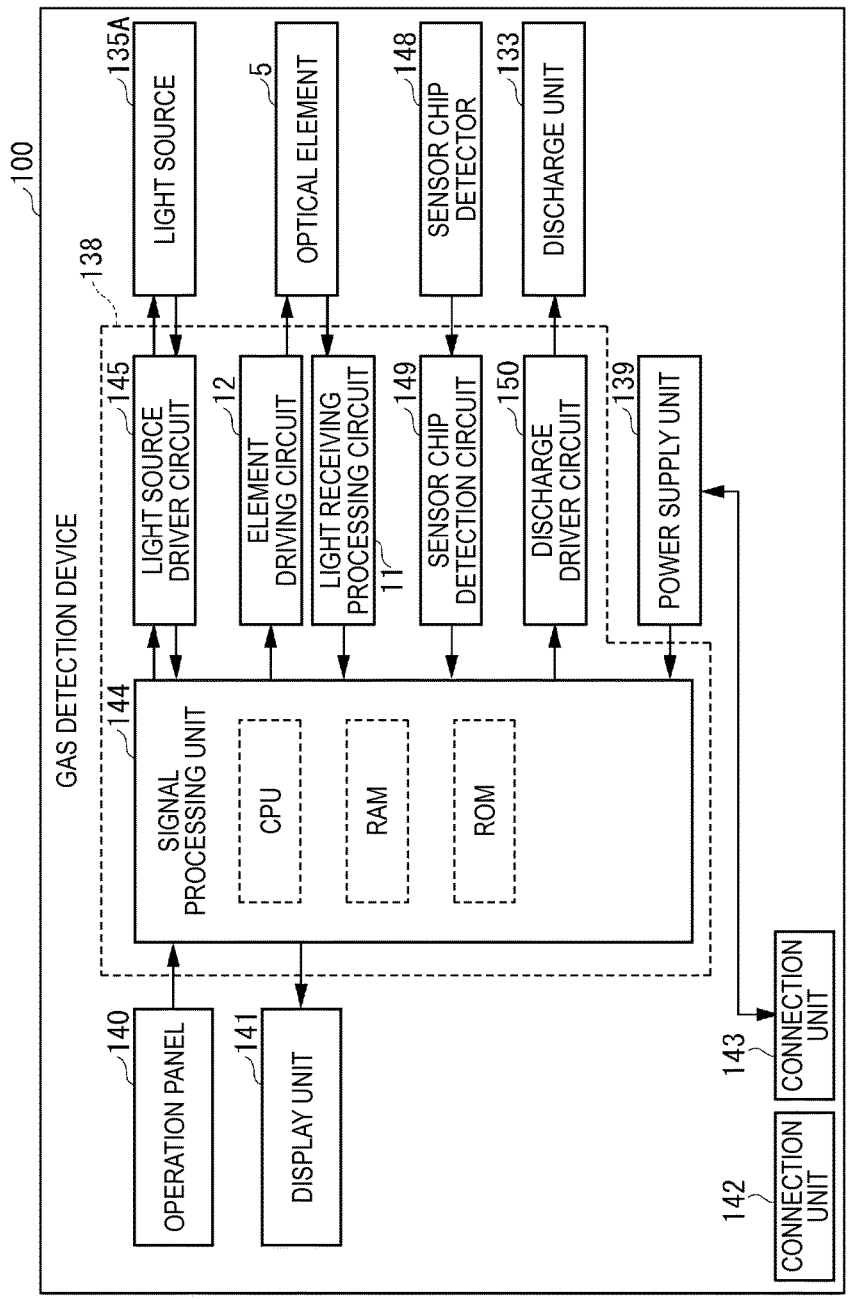
FIG. 13 is a block diagram showing a control system of the gas detection device of FIG. 12.

FIG. 13 is a block diagram showing a configuration of a control system of the gas detection device of FIG. 12.

As shown in FIG. 12, a gas detection device 100 is configured to include a sensor chip 110, a flow channel 120 including a suction port 120A, a suction flow channel 120B, a discharge flow channel 120C and a discharge port 120D, and a body portion 130.

The body portion 130 includes a sensor unit cover 131 having an opening capable of attaching and detaching the flow channel 120, a discharge unit 133, a housing 134, an optical unit 135, a filter 136, a detection device (optical module) including the optical element 5 and the like, a control unit 138 that processes a signal, which is output in accordance with light received by the optical element 5, and controls the detection device and a light source unit, a power supply unit 139 that supplies power, and the like. Meanwhile, a configuration may be given in which the optical element 5A or the optical device 600 is provided instead of the optical element 5. In addition, the optical unit 135 is constituted by a light source 135A that emits light, a beam splitter 135B that reflects the light incident from the light source 135A to the sensor chip 110 side and transmits the light, which is incident from the sensor chip side, to the optical element 5 side, and lenses 135C, 135D, and 135E.

In addition, as shown in FIG. 13, an operation panel 140, a display unit 141, a connection unit 142 for interfacing with the outside, and the power supply unit 139 are provided on the surface of the gas detection device 100. When the power supply unit 139 is a secondary battery, a connection unit 143 for charging may be provided.

Further, as shown in FIG. 13, the control unit 138 of the gas detection device 100 includes a signal processing unit 144 which is constituted by a CPU and the like, a light source driver circuit 145 for controlling the light source 135A, an element driving circuit 12 and a light receiving processing circuit 11 for controlling the optical element 5, a sensor chip detection circuit 149 that reads a code of the sensor chip 110 and receives a signal from the sensor chip detector 148 detecting the presence or absence of the sensor chip 110, a discharge driver circuit 150 that controls the discharge unit 133, and the like.

Next, operations of the gas detection device 100 described above will be described below.

The sensor chip detector 148 is provided within the sensor unit cover 131 provided on the body portion 130, and the presence or absence of the sensor chip 110 is detected by the sensor chip detector 148. When the signal processing unit 144 detects a detection signal from the sensor chip detector 148, the signal processing unit 144 determines that the sensor chip 110 is mounted, and thus outputs a display signal for causing the display unit 141 to display that a detection operation can be performed.

When the operation panel 140 is operated by, for example, a user and an instruction signal for starting a detection process is output to the signal processing unit 144 from the operation panel 140, first, the signal processing unit 144 outputs a signal for operating the light source to the light source driver circuit 145 to thereby operate the light source 135A. When the light source 135A is driven, a stable laser beam which is linear polarized light of a single wavelength is emitted from the light source 135A. In addition, a temperature sensor and a light quantity sensor are embedded in the light source 135A, and the information thereof is output to the signal processing unit 144. When the signal processing unit 144 determines that the light source 135A is stably operating on the basis of the temperature and the amount of light which are input from the light source 135A, the signal processing unit controls the discharge driver circuit 150 to operate the discharge unit 133. Thus, a gaseous sample containing a target substance (gas molecule) to be detected is induced to the suction flow channel 120B, the inside of the sensor chip 110, the discharge flow channel 120C, and the discharge port 120D from the suction port 120A. Meanwhile, the suction port 120A is provided with a dust removing filter 120A1, and thus a relatively large amounts of dust, some amounts of water vapor, and the like are removed.

In addition, the sensor chip 110 is a sensor having a plurality of metal nanostructures embedded therein and using localized surface plasmon resonance. In such a sensor chip 110, an enhanced electric field is formed between the metal nanostructures using a laser beam. When gas molecules enter the enhanced electric field, Raman scattering light including information of molecular vibration and Rayleigh scattering light are generated.

The Rayleigh scattering light and the Raman scattering light are incident on the filter 136 through the optical unit 135. The Rayleigh scattering light is divided by the filter 136, and the Raman scattering light is incident on the optical element 5. The signal processing unit 144 outputs a control signal to the element driving circuit 12. Thus, the element driving circuit 12 drives the electrostatic actuator 56 of the optical element 5 in the same manner as in the first embodiment, and spectroscopically disperses the Raman scattering light corresponding to the gas molecules to be detected, by the optical element 5. When the spectroscopically dispersed light is received by the light receiving unit 58, a light receiving signal based on the amount of light received is output to the signal processing unit 144 through the light receiving processing circuit 11. In this case, it is possible to extract the intended Raman scattering light from the optical element 5 with a high level of accuracy.

The signal processing unit 144 specifies a material by comparing spectrum data of the Raman scattering light corresponding to the gas molecules to be detected, which are obtained in the above-described manner, with data stored in a ROM and determining whether the gas molecules are intended gas molecules. In addition, the signal processing unit 144 displays information as the result thereof on the display unit 141 or outputs the information to the outside from the connection unit 142.

Meanwhile, in FIGS. 12 and 13, an example is described of the gas detection device 100 that spectroscopically disperses Raman scattering light using the optical element 5 and detects gas from the spectroscopically dispersed Raman scattering light. However, as the gas detection device, a gas detection device may be used which specifies the type of gas by detecting the absorbance inherent in gas. In this case, a gas sensor causing gas to flow into a sensor and detecting light absorbed by gas in incident light is used as the optical module according to the invention. In addition, a gas detection device, which analyzes and discriminates the gas having flowed into the sensor by the gas sensor, is used as the electronic device according to the invention. Even in such a configuration, it is possible to detect the components of a gas by using a wavelength variable interference filter.

In addition, examples of a system for detecting the presence of a specific material can include a material component analyzing device such as a non-invasive measurement device of a saccharide using a near-infrared spectrum or a non-invasive measurement device of information of food, a living body, or a mineral, without being limited to the above-described detection of gas.

Hereinafter, a food analyzing device will be described as an example of the above-described material component analyzing device.

Figure 14:
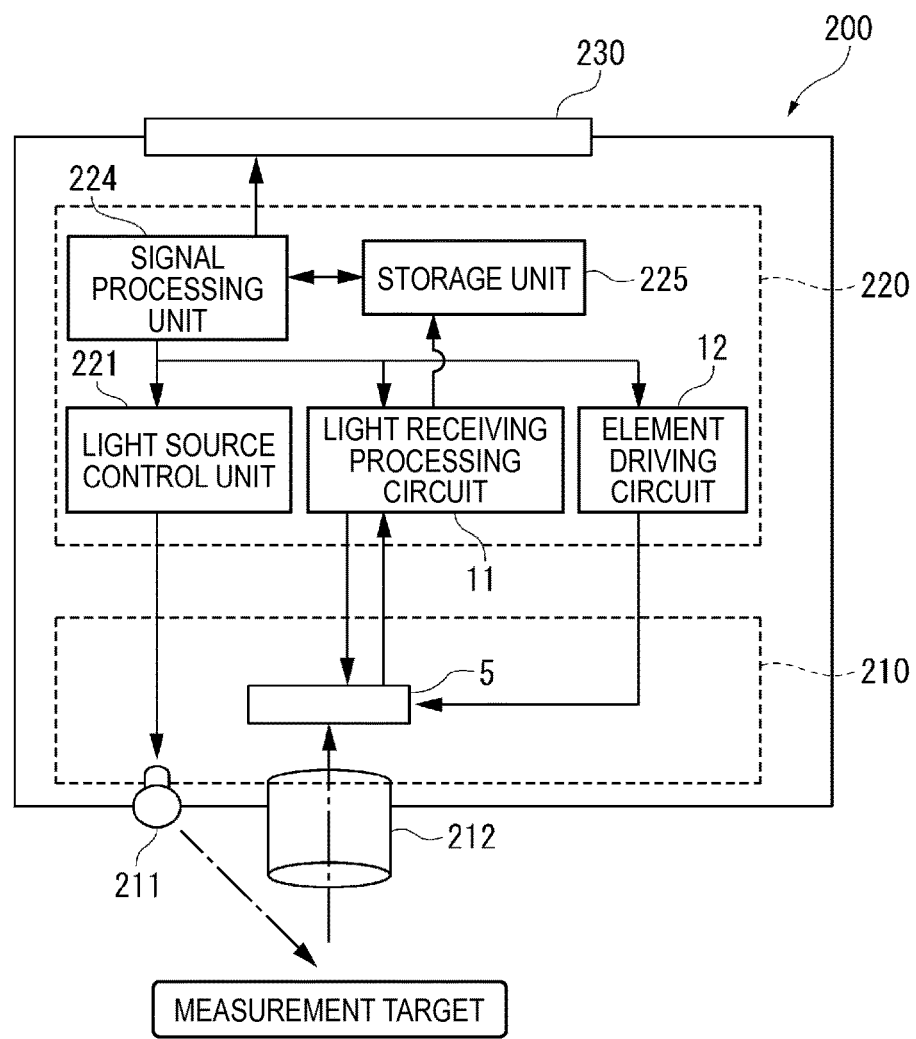
FIG. 14 is a block diagram showing a schematic configuration of a food analyzing device which is another example of the electronic device according to the invention.

FIG. 14 is a diagram showing a schematic configuration of a food analyzing device which is an example of the electronic device using the optical module according to the invention.

As shown in FIG. 14, a food analyzing device 200 includes a detector 210, a control unit 220, and a display unit 230. The detector 210 includes a light source 211 that emits light, the imaging lens 212 to which light is introduced from a measurement target, and the optical element 5 that spectroscopically disperses the light introduced from an imaging lens 212. Meanwhile, a configuration may be given in which the optical element 5A or the optical device 600 is provided instead of the optical element 5.

In addition, the control unit 220 includes a light source control unit 221 that controls lighting and lights-out of the light source 211 and controls brightness during the lighting, the element driving circuit 12 that controls the optical element 5, the light receiving processing circuit 11 that acquires the amount of light which is detected in the optical element 5, a signal processing unit 224, and a storage unit 225.

In the food analyzing device 200, when a system is driven, the light source 211 is controlled by the light source control unit 221, and thus the measurement target is irradiated with light from the light source 211. The light reflected from the measurement target is incident on the optical element 5 through the imaging lens 212. The optical element 5 is driven using the driving method described in the first embodiment, under the control of the element driving circuit 12. Thus, it is possible to detect light of an intended wavelength from the optical element 5 with a high level of accuracy. The signal processing unit 224 changes the value of a voltage applied to the optical element 5 by controlling the element driving circuit 12, and acquires the amount of light with respect to each wavelength.

The signal processing unit 224 performs a computation process on the amounts of light corresponding to wavelengths accumulated in the storage unit 225 to obtain a spectrum at a measurement point. In addition, for example, the storage unit 225 stores information on a food component with respect to the spectrum, and the signal processing unit 224 analyzes data of the obtained spectrum on the basis of the information on food which is stored in the storage unit 225 and measures a food component included in a measurement point of an object to be detected.

In addition, an example of the food analyzing device 200 is shown in FIG. 14, but it is also possible to use non-invasive measurement devices for other pieces of information described above using substantially the same configuration. For example, it is possible to use a living body analyzing device that analyzes a living body component such as the measurement and analysis of a body fluid component such as blood. For example, when a device detecting ethyl alcohol is used as a device that measures a body fluid component such as blood, it is possible to use an intoxicated driving prevention device detecting a driver's drunk state as such a living body analyzing device. In addition, it is also possible to use an electron endoscope system including such a living body analyzing device.

Further, it is also possible to use a mineral analyzing device that analyzes components of a mineral.

Further, the optical module and the electronic device according to the invention can be applied to the following device.

For example, it is also possible to transmit data of light of each wavelength by changing the intensity of light of each wavelength with time. In this case, it is possible to extract data transmitted by light of a specific wavelength by spectroscopically dispersing the light of a specific wavelength by a wavelength variable interference filter provided in an optical module and receiving the light by a light receiving unit. In addition, it is possible to perform optical communication by processing the data of light of each wavelength using an electronic device including such an optical module for data extraction.

In addition, the optical module according to the invention may be used as a living body authentication device, and may also be applied to, for example, an authentication device of a blood vessel, a fingerprint, a retina, an iris and the like which use light of a near infrared region or a visible region.

Further, the optical module and the electronic device can be used as a concentration detection device. In this case, infrared energy (infrared light) emitted from a substance is spectroscopically dispersed and analyzed using an optical element, and the concentration of a test object in a sample is measured.

As described above, the optical element according to the invention can be applied to any device that spectroscopically disperses a predetermined light beam from incident light and detects the amount of light spectroscopically dispersed. As described above, the optical element according to the invention can spectroscopically disperse light into light beams of a plurality of wavelengths using one device and does not require another light receiving device such as a detector. Therefore, as compared with a device of the related art which extracts a desired wavelength using a plurality of devices, the optical module and the electronic device can be facilitated to be reduced in size, and can be suitably used as, for example, a portable or in-car optical device.

Besides, a specific structure at the time of carrying out the invention can be appropriately changed to other structures in a range capable of achieving an object of the invention.

The entire disclosure of Japanese Patent Application No. 2013-223983 filed on Oct. 29, 2013 is expressly incorporated by reference herein.

What is claimed is:

1. An optical element comprising:
a first substrate having a first surface;
a first reflection film that has conductivity formed on the first surface;
a second reflection film that faces the first reflection film;
an insulating film, having light transmittance, which is provided on a side of the first reflection film opposite to the second reflection film, the insulating film being disposed between the first substrate and the first reflection film; and
a light receiving unit provided on the first surface, and which is provided on a side of the insulating film opposite to the first reflection film and within a region where the first reflection film, the second reflection film, and the insulating film overlap each other in a plan view when seen from film thickness directions of the first reflection film and the second reflection film, and which receives light emitted from the first reflection film,
wherein the light receiving unit includes a first light receiving connection electrode, a photoelectric conversion element, and a second light receiving connection electrode.

2. The optical element according to claim 1, further comprising:
a second substrate that faces the first surface of the first substrate and is provided with the second reflection film; and
an electrode which is provided in the second substrate and faces at least a portion of the first reflection film.

3. The optical element according to claim 1,
wherein a third insulating film is provided on a side of the light receiving unit opposite to the insulating film and in a region overlapping at least the light receiving unit in the plan view, and
wherein a second conductive film is provided on a side of the third insulating film opposite to the light receiving unit and in a region overlapping at least the light receiving unit in the plan view.

4. The optical element according to claim 3, wherein the second conductive film is formed of a low-reflection metal having a reflectance which is smaller than a predetermined value.

5. The optical element according to claim 1,
wherein a third insulating film is provided on a side of the light receiving unit opposite to the insulating film and in a region overlapping at least the light receiving unit in the plan view,
wherein a second conductive film is provided on a side of the third insulating film opposite to the light receiving unit and in a region overlapping at least the light receiving unit in the plan view, and
wherein the first reflection film and the second conductive film are electrically connected to each other.

6. An optical device comprising:
the optical element according to claim 1; and
a housing that accommodates the optical element.

7. An electronic device comprising:
the optical element according to claim 1; and
a control unit that controls the optical element.

8. An optical element comprising:
a first substrate having a first surface;
a first reflection film provided on the first surface;
a second reflection film that faces the first reflection film;
a conductive film, having light transmittance, which is provided on a side of the first reflection film opposite to the second reflection film;
an insulating film, having light transmittance, which is provided on a side of the conductive film opposite to the first reflection film, the insulating film being disposed between the first substrate and the first reflection film; and
a light receiving unit provided on the first surface, and which is provided on a side of the insulating film opposite to the conductive film and within a region where the first reflection film, the second reflection film, the conductive film, and the insulating film overlap each other in a plan view when seen from film thickness directions of the first reflection film and the second reflection film, and which receives light emitted from the first reflection film,
wherein the light receiving unit includes a first light receiving connection electrode, a photoelectric conversion element, and a second light receiving connection electrode.

9. The optical element according to claim 8, wherein a second insulating film is provided between the first reflection film and the conductive film.

10. The optical element according to claim 9,
wherein a third insulating film is provided on a side of the light receiving unit opposite to the insulating film and in a region overlapping at least the light receiving unit in the plan view,
wherein a second conductive film is provided on a side of the third insulating film opposite to the light receiving unit and in a region overlapping at least the light receiving unit in the plan view, and
wherein the conductive film and the second conductive film are electrically connected to each other.

11. An optical device comprising:
the optical element according to claim 8; and
a housing that accommodates the optical element.

12. An electronic device comprising:
the optical element according to claim 8; and
a control unit that controls the optical element.

13. An optical element, comprising:
a first substrate;
a first reflector that has conductivity;
a second reflector that faces the first reflector;
an insulator that is disposed between the first reflector and the first substrate; and
a light receiving element that is disposed between the insulator and the substrate,
wherein the light receiving element includes a first light receiving connection electrode, a photoelectric conversion element, and a second light receiving connection electrode.

* * * * *